(12) United States Patent
Swinton et al.

(10) Patent No.: US 7,610,349 B1
(45) Date of Patent: Oct. 27, 2009

(54) PHOTO-SERVING COMMUNICATION PROTOCOLS AND METHODOLOGY FOR PROVIDING DISPARATE HOST DEVICES WITH FTP-LIKE ACCESS TO DIGITAL IMAGES RESIDING ON A DIGITAL CAMERA DEVICE

(75) Inventors: William G. Swinton, Santa Cruz, CA (US); David Vogel, Santa Cruz, CA (US); Philippe R. Kahn, Scotts Valley, CA (US); Eric O. Bodnar, Santa Cruz, CA (US); Timothy W. Genske, Aptos, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 1497 days.

(21) Appl. No.: 09/703,412

(22) Filed: Oct. 31, 2000

(51) Int. Cl.
*G06F 15/16* (2006.01)

(52) U.S. Cl. .................... 709/216; 709/217; 709/218; 709/219; 709/220

(58) Field of Classification Search .............. 710/33, 710/307, 303; 704/270; 348/207, 231, 211; 709/203, 327, 322, 323, 227, 216, 218, 220, 709/217, 211
See application file for complete search history.

(56) References Cited

U.S. PATENT DOCUMENTS 5,675,831 A * 10/1997 Caputo .................... 710/10

(Continued)

FOREIGN PATENT DOCUMENTS

EP 0835013 4/1998

(Continued)

OTHER PUBLICATIONS

UPnP Device Architecture, Version 1.0, Jun. 8, 2000, Contributing Members of the UPnp Forum.*

(Continued)

*Primary Examiner*—William C Vaughn, Jr.
*Assistant Examiner*—Djenane M Bayard
(74) *Attorney, Agent, or Firm*—Blakely, Sokoloff, Taylor & Zafman, LLP; Judith A. Szepesi

(57) ABSTRACT

A methodology for providing FTP-like server capability to a portable, intermittently-connected device, such as a digital camera device, is described. Using XML syntax, a photo-serving protocols suite supporting FTP-like photo-serving capability is incorporated into a digital camera device (or other portable device), so that digital images (or other files) on that device may be easily accessed by a variety of disparate hosts over standard protocols. If desired, standard (e.g., generic) FTP may be employed instead of the photo-serving protocols. All hosts that are commonly available include implementations of industry-standard TCP/IP protocols on which the photo-serving protocols may be borne. As a result, no host need have a proprietary, one-off solution to bear the photo-serving protocols. The camera device, at the level of the photo-serving protocols, functions in an identical manner no matter what host the camera device is attached to, and no matter how an individual industry-standard protocol suite is borne or implemented. In this fashion, a variety of host devices can access digital photos (or other files or objects) on the camera device with the same ease that a desktop computer may access files from an FTP server, for purposes of receiving or manipulating photographic image information captured on the digital camera device.

61 Claims, 9 Drawing Sheets

U.S. PATENT DOCUMENTS

| | | | |
|---|---|---|---|
| 5,737,491 A * | 4/1998 | Allen et al. | 704/270 |
| 5,848,420 A | 12/1998 | Xu | |
| 5,917,542 A | 6/1999 | Moghadam et al. | |
| 6,005,613 A * | 12/1999 | Endsley et al. | 348/231.6 |
| 6,043,837 A | 3/2000 | Driscoll, Jr. et al. | |
| 6,148,354 A * | 11/2000 | Ban et al. | 710/301 |
| 6,269,402 B1 * | 7/2001 | Lin et al. | 709/227 |
| 6,353,848 B1 * | 3/2002 | Morris | 709/203 |
| 6,529,969 B1 * | 3/2003 | Inoue | 710/33 |
| 6,535,243 B1 * | 3/2003 | Tullis | 348/207.1 |
| 6,549,958 B1 * | 4/2003 | Kuba | 710/14 |
| 6,606,669 B1 * | 8/2003 | Nakagiri | 719/327 |
| 6,628,325 B1 * | 9/2003 | Steinberg et al. | 348/211.1 |
| 7,020,881 B2 * | 3/2006 | Takahashi et al. | 719/322 |
| 2002/0171737 A1 * | 11/2002 | Tullis | 348/143 |
| 2003/0135681 A1 * | 7/2003 | Laity et al. | 710/303 |
| 2003/0142215 A1 * | 7/2003 | Ward et al. | 348/207.1 |

FOREIGN PATENT DOCUMENTS

| | | |
|---|---|---|
| EP | 0949805 A2 | 10/1999 |
| GB | 2289555 | 11/1995 |
| GB | 2365177 | 2/2002 |
| WO | WO 99/06910 | 2/1999 |

OTHER PUBLICATIONS

Simpson, W. (Ed.), RFC 1661, "The Point-to-Point Protocol (PPP)," Jul. 1994, 50 pages.

* cited by examiner

PHOTO-SERVING COMMUNICATION PROTOCOLS AND METHODOLOGY FOR PROVIDING DISPARATE HOST DEVICES WITH FTP-LIKE ACCESS TO DIGITAL IMAGES RESIDING ON A DIGITAL CAMERA DEVICE

RELATED APPLICATIONS

The present application claims the benefit of priority of, and is a continuation-in-part of, commonly-owned application Ser. No. 09/660,531, filed Sep. 13, 2000, titled SYSTEM AND METHOD FOR DYNAMIC UPLOADING AND EXECUTION OF APPLICATIONS AND DRIVERS BETWEEN DEVICES, now pending, the disclosure of which is hereby incorporated by reference. The present application is also related to commonly-owned application Ser. No. 09/537,001, filed Mar. 28, 2000, titled IMPROVED DIGITAL CAMERA DEVICE AND METHODOLOGY FOR WIRELESS PROGRESSIVE TRANSMISSION OF DIGITAL IMAGES, now pending, the disclosure of which is hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to a system and methodology for improved exchange of objects (e.g., files, such as digital photographs) between a client device (e.g., digital camera) and a multitude of disparate host devices, for instance, upon connection of the client device to one or more different host devices.

Today, a multitude of different types of devices may be intermittently connected together for a particular user purpose. For example, many of the digital camera devices available today include the capability of connecting to different types of modules. Examples include modules that can transmit the camera's image data, modules that can print the image data, and modules that can display the image data, just to name a few. In order to support meaningful dialog between such devices, it is necessary to provide a mechanism that allows the camera device to identify what target or host device it is connected to and vice versa (i.e., identifying the camera device to the target device), as well as a mechanism that allows a program (e.g., driver) to run on the target device so that the target device may correctly communicate with the camera device. For example, a driver program or application executing at the target device can issue appropriate commands to the camera device for determining what image data (photos) exist on the camera device, so that they may be offloaded onto the target device for viewing, printing, or storing.

Generically speaking, a "driver" is a software program that controls a device, typically allowing that device to interoperate with other devices. For example, a printer driver allows a corresponding printing device to interoperate with software programs operating on a desktop computer that the printer is connected to. A driver acts like a translator between the device and programs that use the device. Devices typically include their own set of specialized commands that only its driver knows. At the same time, most programs prefer to access devices by using generic commands. The driver, therefore, may serve as a go-between by accepting generic commands from a program and then translating them into specialized commands for the device. Many drivers, such as keyboard drivers, come with a user's operating system. For other devices, the system is required to load a new driver when the user connects the device to his or her computer.

In the early days of personal computing, a user was required to manually install the appropriate driver for any new device that the user connected to his or her computer. More recently, that manual approach has been abandoned in favor of a "plug and play" approach. As an example familiar to PC users, today "plug and play" PCI bus cards (e.g., video graphics cards and sound cards) include code within them that triggers loading at operating system startup of a particular driver. "PCI" is an acronym for Peripheral Component Interconnect, a local bus standard developed by Intel Corporation. If the operating system (e.g., Windows 98) is able to locate a copy of the driver for a newly-installed PCI bus card, the driver is automatically loaded by the operating system to support operation of that PCI bus card. Note in particular with this approach, however, the host device (e.g., PC) must either already possess a copy of the relevant driver (e.g., in the Windows "cabinet" files) or the user is required to manually furnish the driver (e.g., by inserting a floppy disk or CD including the relevant driver).

In practice, the approach has been less than "plug and play." Often, the operating system is unable to recognize a newly-installed device or, worse, "crashes" (i.e., hangs) while attempting to uncover nearly-installed devices. Another problem is that, even if a newly-installed device is recognized, the operating system is unable to automatically locate a copy of an appropriate driver for that device. In that situation, the system resorts to prompting the user to indicate where a copy may exist, and in some cases requires the user to manually install and configure the appropriate driver. Given these and other problems that have beset "plug and play," the approach has been given the more dubious title of "plug and pray" by the computer industry press. Nevertheless, "plug and play" architecture represents perhaps the first serious attempt to provide some degree of automated driver installation.

With the ever-increasing popularity of Internet-based computing, it is not surprising that others have turned to the Internet in an effort to provide dynamic loading of drivers and other applications. For instance, as a result of using a Web browser, a user may trigger the automatic downloading of a particular driver. In this example, the driver is transferred from a Web server to the user's PC using HTTP protocol. HTTP or "HyperText Transfer Protocol" is the underlying protocol used by the World Wide Web. HTTP defines how messages are formatted and transmitted, and what actions Web servers and browsers should take in response to various commands. Using HTTP in the Internet environment, "plug-in" functionality can be provided that supports some degree of automated driver or application installation and startup loading. A plug-in is a software (or hardware) module that adds a specific feature or service to a larger system. For example, there are a number of plug-ins for the Netscape Navigator browser that enable it to display different types of audio or video messages.

Despite the multitude of approaches available for automating driver installation and startup loading, current approaches have significant shortcomings when attempting to connect two devices together. Many different types of devices exist and, expectedly, have disparate characteristics as to how they initially respond to a communication (between devices). In particular, many devices today "speak differently" (i.e., employ different communication protocols), thus preventing several of these devices from communicating with one another for purposes of device identification and driver-loading. For instance, the above plug-in approach basically assumes that all devices speak the same language, such as using HTTP commands over TCP/IP (Transmission Control Protocol/Internet Protocol, the suite of communications protocols used to connect hosts on the Internet). However, even the underlying communication infrastructure—TCP/IP—may not even be running initially on a particular target or host device of interest. Thus, one may not even rely on TCP/IP being available, at least initially, on a particular target device. (For an introduction to TCP/IP, see e.g., *RFC* 1180: *A TCP/IP Tutorial*, the disclosure of which is hereby incorporated by reference. A copy of RFC 1180 is currently available at ftp://ftp.isi.edu/in-notes/rfc1180.txt).

Another problem which exists is how to efficiently deal with a multitude of digital images, which are produced in abundance by digital cameras. These images need to be transferred or uploaded to hosts for ultimate viewing or printing. Hosts include, for instance, desktop computers (PCs) running Microsoft Windows, UNIX, Macintosh, and Linux. In practice, images need to be transmitted over a variety of short-haul and long-haul communication facilities. A "short-haul" communication facility includes local connectivity, such as a digital camera occasionally connected to a desktop computer over a serial communication link (e.g., RS-232 or USB). A "long-haul" communication facility would include a Web server located thousands of miles away from the user's present location, which is accessible via the Internet or even through a dial-up direct connection.

Given this environment, a problem arises as to how one supports multiple disparate hosts in an efficient and expandable way. What is needed is an approach affording reliable communication that is easily implemented on a variety of hosts. To that end, it is desirable to not adopt "one-off" solutions, which require implementation on a host-by-host basis. This need is accentuated in environments supporting progressive image rendering. In such environments, a host may need to select certain portions of an image, and keep track of synchronization information indicating which portions have already been retrieved.

To date, approaches to the foregoing problem have relied on partial solutions. For example, today there exists a variety of digital camera-to-desktop computer communication links (i.e., locally-connected host). Here, camera vendors have each implemented their own proprietary protocol overlaid on top of existing serial communication links, for supporting enhanced connectivity between a digital camera and its locally-connected host. The advantage of such an approach is that each vendor is able to provide enhanced connectivity, including support for advanced camera control functions and picture uploading functions. The disadvantage of such an approach, however, is that each vendor's implementation is proprietary to that vendor; there is no open standard. Moreover, such an approach has been, to date, specific to short-haul communication, namely between a digital camera connected to a local PC.

These shortcomings have yet to be adequately addressed. What is needed is improved communication protocols and methodologies that allow a device (e.g., digital camera device) to communicate seamlessly to a variety of different host devices (e.g., handheld computing devices), upon being connected together. The present invention fulfills this and other needs.

SUMMARY OF THE INVENTION

A methodology for dynamic (i.e., run-time) uploading and execution of applications and drivers between devices (e.g., between "client" device and one or more (host) devices) in an automated manner is described. The device, which is to be hosted (e.g., the "client" device), initially probes its environment to determine which device or devices it is attached to (e.g., the "host" device(s)). Once it has correctly discerned the relevant host or target device(s), the client device includes the capability of immediately sending out (i.e., uploading) a particular driver or application (i.e., object or file of interest) for placement, and ultimately execution, at the host device. Once the particular object or file of interest has been "injected" into the host device and is executing, the client device may simply revert to a "listening mode" in which it waits to be told what to do (i.e., receive commands from the application or driver which is now executing at the host device). In the currently-preferred embodiment, a digital camera device serves as a "client" device, which may connect to a variety of "host" devices (e.g., cellular phone, PDA (Personal Digital Assistant) handheld device, or the like).

The overall method or process of the present invention may be summarized as follows. The process gets underway upon the establishment of a connection (wireless or wireline) between a client device and a host device; the connection may be permanent or temporary. Starting with default registry information stored in a configuration registry, the client device probes for any host devices. This task falls specifically on a PHY (physical) manager. Based on the information uncovered by this probing, the registry is updated, with information describing discovered host devices and corresponding communication information relevant to each such discovered host device. As part of this step, the PHY manager will ensure TCP/IP connectivity to each such host device.

Now, the method may proceed with injection of the application or driver (or other executable object of interest) into the host device(s). The method may examine the registry for determining each host device that is connected, as this will determine what specific task(s) must be undertaken for performing injection (i.e., to inject an appropriate application or driver into each such host device). A TCP/IP session is established with the host device, for the specific purpose of injecting the file or object of interest (e.g., application or driver). The file is opened on the client device; as part of this process, a client-side file handle is obtained. From the perspective of the client device, the file is simply a binary object to be injected. The specific relevance of the file will be uncovered at the host device, when the file is ultimately executed at the host device. Having obtained a valid file handle for the file to be injected, the method may now proceed to package the file contents for transmission to the host device. In the currently-preferred embodiment, the XML protocol is employed for this packaging. Now, using TCP/IP, the packaged file may be transmitted (streamed) from the client device to the host device. In conjunction with this step, a host-side file handle is returned to the client device.

At this point, the method is now ready to trigger execution of the just-injected application or driver at the host device. Using the host-side file handle, the method instructs the host to now execute the just-injected application or driver. Host-side execution may require host-specific operations. In the straightforward case, the host is simply instructed to begin execution of the application or driver. If the host device does not support that functionality, however, execution of the application or driver may be accomplished through indirect means, such as instructing the host to "restart" itself and thereupon execute the application or driver (e.g., by placing the application or driver in a location where the host will automatically load it for execution upon startup). Thereafter, operation between the client and host devices continues as specified in the now-executing application or driver, which itself in turn may unpackage other drivers for execution. In a typical operation, the application or driver would issue particular commands to the client device, for instance, requesting that the client device transmit particular information that is to be processed by the host device, such as uploading digital photographs from the client device to the host device, for wireless transmission by the host device to yet another device (e.g., server computer).

This approach is particularly well-suited for devices which serve as "add-on" devices (clients) to other devices (hosts) that are "smarter," for instance, including more processing capability and/or memory. In this scenario, the client device enters into a dialog with a device with more resources for the purposes of harnessing the resources of the host device for operating the client or add-on device. The client device is, using this approach, able to start running (i.e., driver-directed operation) immediately upon attachment to a host device that can be identified.

In the present application, the approach is extended to impart FTP-like server capability to a client device, such as a digital camera device, by providing the client device with photo-specific file-serving protocols (i.e., "photo-serving protocols"), wrapped within XML syntax. Thus, the client device becomes a file-serving "host" in its own right, so that it may serve up files to the host device that it is connected to. In instances where a client device does not process or handle photographic or digital images, standard (i.e., generic) FTP or other file-serving protocol may be employed instead. In that instance, FTP support will often already be present at the host device. Regardless of whether generic FTP or photo-specific file-serving protocols are used, the client device includes the capability of injecting support (e.g., driver) into host devices, as needed.

A particular advantage of FTP or "File Transfer Protocol" is its ability to shield one system from variations or peculiarities in the file storage systems of available hosts, thereby providing uniform access. As a result, using FTP, a user can also easily update (delete, rename, move, and copy) files, even though the files themselves reside at a server, located thousands of miles away, that employs a file storage system radically different than that employed by the user's own system. In accordance with the present invention, therefore, FTP-like photo-serving capability is incorporated into a digital camera device (or other portable device) in order to allow it to act like a file server, so that digital images or other files on that device may be easily accessed by a variety of disparate hosts over standard protocols.

A client device (e.g., digital camera) and the host device (e.g., desktop or server computer) include a communication stack incorporating industry-standard protocols, including: a hardware communication link layer (e.g., RS-232, USB, wireless, or the like), a PPP layer, an IP layer, and a TCP layer. The communication stack of each is enhanced to include a photo-serving protocols suite of the present invention, within the context of providing FTP-like photo-serving capability to a digital camera device. In particular, on top of each TCP layer, a photo-serving protocols suite is provided: photos-suite protocols (layer) for the client device, and corresponding photos-suite protocols (i.e., photo-serving protocols suite layer) for the host device. The photo-serving protocols suite layer embodies the primary functionality for transferring digital photos or other objects from the client (camera) device to the host, or vice versa (e.g., for host-initiated manipulation of digital photos residing on the client device). In a more-generic embodiment, existing FTP protocols themselves may be used instead of the photo-serving protocols employed in the preferred embodiment; in that case, the hosting device will typically already include FTP support.

On the client device, an extra layer is (logically) laid on top of the hardware communication layer. This is the previously-described PHY (physical) manager (layer) that allows the camera to get information regarding the kind(s) of (physical/hardware) communication link that is available. The layer can automatically: (1) configure whether it is a "calling" or "answering" party, (2) determine the nature of the communication link provided (which may then be used by the photo-serving protocols), and (3) determine the cost of the communication link provided. The PHY manager provides all layers above it with an identifier characterizing the currently-available communication link. This allows those upper layers to adjust their own configurations, as needed, for digital communication. The PHY manager includes a knowledgebase—the registry—with a priori knowledge of communication links/media supported. As a result, the PHY manager also knows beforehand certain preferences that may be required to enable the use of industry-standard protocols in a manner that is appropriate for a given (physical) communication link, including for instance transmission speed properties (and potential transmission costs to users). In this fashion, the PHY manager provides flexibility in sensing the available connectivity.

In the exemplary embodiment of a mobile digital camera device connected to a computer host (e.g., handheld, desktop, or server computer), the following operation occurs in the context of the user connecting the camera device (through wireless or wireline means) to the host device, for the exemplary purpose of uploading photos from the camera device to the host device, whether the hosts be local or remote. The camera device enables the movement of photographic information from the camera to a host device (or vice versa) by continually looking for ways to communicate with an appropriate host (for the particular user). Based on a priori knowledgebase preferences stored in the camera-side registry, the PHY manager, as incorporated into the camera device, seeks out certain physical communication media/links. At the outset, therefore, the client device (e.g., camera device) senses the availability of a physical communication media/link. This may result, for instance, from the occurrence of a communication cable being plugged into the camera device, a modem being plugged into the camera device, a cellular phone being plugged into the camera device, or any other device supporting byte-by-byte, serial-like communication with the camera device.

In the currently-preferred embodiment, this act of sensing an available communication link/medium is undertaken in a query/response fashion. Because of the knowledgebase information, the expected response for a given query is known in advance. In particular, each expected response is stored as a long-term preference registry setting, as a factory preset value. Upon establishing an identification for a given communication link of an attached host device, the PHY manager signals a higher-level communication module, the device communication management module, as to the details of the communication link/medium (which are known a priori, based on registry configuration). In particular, the PHY manager is able to resolve a particular registry key ID, for referencing the appropriate registry configuration information (for the given communication link/medium). Using the ID as a key, the device communication management module accesses the registry to look up the specific details of connectivity, as previously determined to be desirable (based on factory preset values). In other words, based on the ID, the device communication management module may reference the registry for determining a desired communication subconfiguration, which has been previously specified as desirable by the device's vendor during manufacturing.

The subconfiguration information indicates a particular type of activity that the client device should engage in, with respect to providing FTP-like photo-serving capability through the uncovered communication link/medium. The choices are as follows: (1) do nothing, (2) actively "call" host, or (3) passively "wait for a call" from host. The individual cases function as follows. The "do nothing" action scenario represents a situation where no picture information exists to move or transmit, in which case the camera has simply been attached to a physical link. The "call host" action scenario represents a situation where the camera device establishes a communication session with the host, using industry-standard communication protocol layers (e.g., PPP, TCP, and IP, as previously introduced). Once the communication session has been established, an error-free communication channel exists between the camera device and the host device. In this instance, the camera may begin executing photo-serving protocols of the present invention. The photo-serving protocols present the camera device as a remote file system to the host. The photo-serving protocols run in a single, consistent manner, regardless of how the communication session itself was established. The "wait for host call" action scenario represents a situation where the camera device waits for a call from the host (in the PPP sense). The host calls to access the camera device over the industry-standard IP protocol suite. Now, the photo-serving protocols run in the same manner as the previous connectivity scheme.

As a result of this approach, the camera device, at the level of the photo-serving protocols, functions in an identical manner no matter what host the camera device is attached to, and no matter how an individual industry-standard protocol suite is borne or implemented. Thus, a variety of host devices can access digital photos (or other files or objects) on the camera device with the same ease that a desktop computer may access files from an FTP server. All hosts that are commonly available include implementations of industry-standard TCP/IP protocols on which the photo-serving protocols may be borne. As a result, no host need have a proprietary, one-off solution to bear the photo-serving protocols. In this manner, the photo-serving protocols provide various hosts with the capability to engage in an FTP-like session with the camera device to receive and manipulate photographic image information captured on the digital camera device.

DETAILED DESCRIPTION OF A PREFERRED EMBODIMENT

The following description will focus on the presently-preferred embodiment of the present invention, which operates in an environment typically including a variety of computing or information-storing devices (e.g., desktop computers, server computers, and portable computing devices), that are occasionally or permanently connected to one another where device-specific driver support is desired. In particular, the following description focuses on an embodiment of the present invention in a digital camera device, the currently-preferred embodiment, which may be occasionally connected to a multitude of different "host" devices, such as a Palm™ handheld computer or a cellular phone. However, those skilled in the art will appreciate that the present invention may be embodied in practically any device that is intended to be connected to another device (or devices). Further, the description focuses on implementation of portions of the invention in a connected environment including computers, such as an IBM-compatible computer running under Microsoft® Windows 2000, with Internet support. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, and the like, as well as special-purpose operating systems (e.g., digital camera operating systems). Therefore, the description of the exemplary embodiments which follows is for purposes of illustration and not limitation.

Basic System

A. Digital Camera Hardware

Figure 1A:
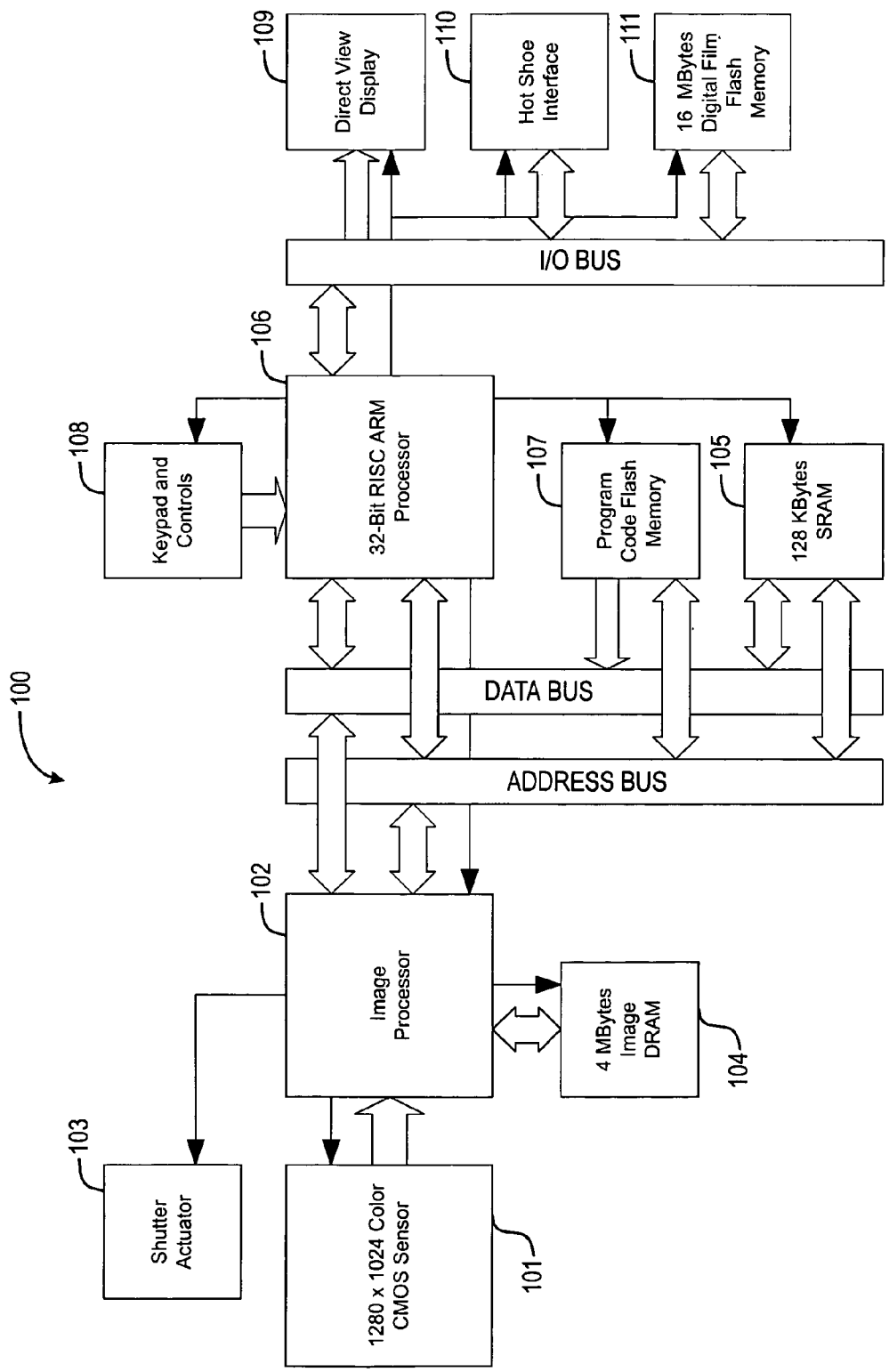
FIG. 1A is a block diagram illustrating a device, in the preferred embodiment of a digital camera device, that is suitable for implementing the present invention.

FIG. 1A is a block diagram illustrating a basic image capturing and recording system 100 suitable for implementing the present invention. For purposes of illustration, the following focuses on implementation of the system 100 as a digital camera. However, as noted above, for purposes of implementing the methodology of the present invention, the system 100 may also be implemented in a variety of other devices that are intended to be connected (including, occasionally connected) to yet other devices.

As shown in FIG. 1A, the system 100 includes a Sensor 101, a Shutter Actuator 103, an Image Processor 102, an Image (DRAM) Memory 104, a (Central) Processor 106, a Keypad and Controls 108, a Program Code Flash Memory 107, a (System) Memory 105, a Direct View Display or Viewfinder 109, a Hot Shoe Interface 110, and a "Digital Film" Flash Memory 111. As illustrated, these various components communicate with one another using a bus architecture including, for instance, an Address Bus, a Data Bus, and an I/O (Input/Output) Bus.

The system 100 employs the Sensor 101 for basic image capture. The Sensor 101 operates, in essence, by capturing light and transforming that into electrical voltage levels. A suitable sensor is available from a variety of vendors, including VLSI Vision, Motorola, and Toshiba. In a preferred embodiment, the Sensor 101 includes, for example, a 1280× 1024 color CMOS sensor, such as a VLSI Vision VVL 6801 CMOS sensor. However, other sensor technology is suitable, including CCD sensors.

The Sensor 101 must, of course, be part of a larger assembly to operate. Specifically, the Sensor 101 operates in conjunction with a lens assembly (not shown), or other optics to focus an image onto the sensor. The optics themselves are controllable, for instance, using a conventional aperture, focus, and shutter control mechanisms. The currently-preferred embodiment uses an 18 mm fixed-focal length, fixed-aperture lens assembly to provide a broad depth of field. The lens assembly employs two manual slide controls, a macro lens control, and an exposure control. The macro control switches from normal to close-up mode by sliding a macro lens in and out of the lens assembly to provide normal or extreme close-up capability. The exposure control switches from normal to bright light by sliding a neutral gray filter in and out of the lens assembly. Aside from choosing normal or bright light, and normal or close-up mode, the camera requires no manual focusing, shutter speed, or aperture adjustment. Operation is as simple as point and shoot. The Sensor 101, on the other hand, operates under control of the Image Processor 102, which will now be described.

The Image Processor 102, which basically operates as a state machine, provides overall control for the Sensor 101. In operation, the Image Processor 102 controls the Sensor 101 by, in effect, telling it what to do and when. For instance, the Image Processor 102 issues timing signals to the Sensor 101 for indicating how the Sensor 101 should record and stream out image data. Further, the Image Processor 102 provides general Input/Output (I/O) control that allows one to coordinate control of the sensor with other electromechanical peripherals, such as a shutter, lens aperture, or the like.

Actual implementation of the Image Processor 102 itself may be accomplished in a variety of different ways. For a microprocessor-based implementation, for instance, the Image Processor 102 may be implemented as a microprocessor (e.g., PowerPC 823 microprocessor, available from Motorola, Inc. of Schaumburg, Ill.) with DSP (digital signal processing) logic blocks, memory control logic blocks, video control logic blocks, and interface logic. Alternatively, the Image Processor 102 may be implemented as a "camera on a chip(set)" using, for instance, a Sierra Imaging Raptor I or II chipset (available from Sierra Imaging, Inc. of Scotts Valley, Calif.), a Sound Vision Clarity 1 or 2 chipset (available from Sound Vision, Inc. of Framingham, Mass.) or similar chipset that integrates a processing core with image processing periphery. In a preferred embodiment, the Image Processor 102 preferably supports hardware implementation of a wavelet-transform engine complete with a wavelet-transform filter bank, so that the wavelet-transform process may be pipelined through a series of dedicated hardware gates (instead of executed as a sequence of software instructions repeatedly loaded and processed by a general-purpose microprocessor).

The Image Processor 102 is not a stand-alone part but, instead, relies on the (Central) Processor 106 for control instructions. The Image Processor 102 sits on the Address and Data Buses and is accessible by the Processor 106 through a series of registers. In this manner, the Processor 106 may instruct the Image Processor 102 what to perform and when. For instance, the Processor 106 may instruct the Image Processor 102 to turn on the Sensor 101, to capture an image at the Sensor 101, and to execute the wavelet transform. Therefore, the Image Processor 102 is very much a facilitator but is not in and of itself a controller for the system.

The Shutter Actuator 103 is a simple, generic component for controlling light exposure on the Sensor 101. Depending on the behavior of the actual sensor employed, the Shutter Actuator 103 may not even be necessary. In particular, the Shutter Actuator 103 is employed in those instances where the Sensor 101 requires a black reference. In such an embodiment, the Shutter Actuator 103 is an electromechanical interface coupled to a solenoid which, when the interface responds to a particular logic level, triggers an open/close cycle of a mechanical shutter. The mechanical shutter, which serves to selectively block light entering the lens assembly of the camera, may be of a conventional design available from a variety of suppliers. A suitable supplier includes, for instance, Sunex, Inc. of Carlsbad, Calif.

The Image Memory (DRAM) 104 serves to store the image captured from the sensor. The Sensor 101 itself does not "store" the image that it captures. Therefore, the Image Memory 104 is an image capture and in-place transform (frame) buffer. This memory is controlled by the Image Processor 102 and can be shut off when not in use for power saving purposes. During basic operation of the camera, the captured image is transferred directly into the Image Memory 104, using a sample/transfer technique. In order to make this efficient, the process is controlled by the Image Processor 102 in a manner somewhat akin to DMA (direct memory access) transfer employed on desktop computers. Here, the Image Processor 102 functions as a state machine which simply samples and transfers information from the Sensor 101 to the Image Memory 104. In the presently-preferred embodiment, the Image Memory 104 comprises conventional DRAM (dynamic random-access memory) memory available from a variety of vendors, including, for instance, Toshiba, Micron, Hitachi, Samsung, and others. A size of about 4 MB (megabyte) or more is suitable for this component.

The next several components discussed, which may be viewed as components hanging off of the Address and Data Buses of the Processor 106, are typical components that one would ordinarily expect to find when implementing a data processing device; collectively, these components may be viewed as a computer embedded in the camera. For example, these components include the previously-mentioned general-purpose microprocessor (Processor 106) coupled to memory (System Memory 105 and Program Code Flash Memory 107). The Working or System Memory 105 is the general working or scratchpad memory for the Processor 106. This memory is used for storing program-created variables, stacks, heap(s), and the like. In the presently-preferred embodiment, the System Memory 105 comprises static RAM (e.g., SRAM), which is also available from a variety of vendors. A size of about 128 KB (kilobyte) or more is suitable for this purpose. The Program Code Flash Memory 107, on the other hand, comprises 1 MB of directly-addressable flash storage that holds the operating system and embedded software, that is, the program code comprising the instructions that the processor must execute to operate. The flash memory, which may be conventional flash memory that is available from a variety of vendors, need not be of the removable type, as the Program Code Flash Memory 107 is not intended to be removed from the system by the camera user.

The Processor 106 itself, in the presently-preferred embodiment, comprises a 32-bit RISC ARM Processor designed by ARM Limited of Maidenhead, UK. ARM licenses its designs to semiconductor partners for manufacture, supply, and support; for a list of ARM licensees, see e.g., http://www.arm.com/Partners/. The ARM processor has an efficient instruction set that is ideal for performing cyclical functions quite rapidly and includes sufficient bandwidth for transferring large amounts of data quickly (e.g., for performing Huffman coding on a large amount of data). Additionally, the processor is a dedicated processor, without the overhead of a substantial number of peripherals. These features make the processor attractive for use in a digital camera embodiment.

For a camera embodiment, the device will, in general, be expected to include an interface that is capable of receiving input from users. Keypad and Controls 108 are conventional inputs that support user input. Similarly, the Direct View Display ("Viewfinder") 109 is a direct view LCD (liquid crystal display) that provides feedback to the user or camera operator. During photography mode, the Viewfinder 109 replaces the plastic viewfinders and LCD panels found on most digital cameras and provides the most accurate real-time representation of the scene visualized by the sensor. The Viewfinder 109 overlays simple icons onto the image to indicate the status of various camera settings. The Viewfinder 109 fits inside an eyepiece which keeps sunlight out and allows the operator to visualize the scene in any lighting conditions. During preview mode, the Viewfinder 109 shows previews of the captured photos and allows the operator to delete unwanted photos or tag photos for wireless transmission. Thus for a camera embodiment, the Viewfinder 109 is used to provide a representation of the image that is being captured, in preview and/or post-capture fashion.

In order to provide the display image to the Viewfinder 109, the Sensor 101 is subsampled at a rate to create a version of the image appropriate for display. During preview processing, the system continuously captures the sensor mosaic and sub-samples the resulting mosaic for preview purposes. A histogram of the sampled luminosity is fed into a "linearization" filter to produce a balanced dynamic range for best optical perception. The scaled and "linearized" image is then displayed on the viewfinder module. The histogram data is then adjusted to match the preview image for use in linearizing the next image. The cycle is repeated continuously to provide a real-time viewfinder mechanism. The Viewfinder 109 itself typically operates in conjunction with a display controller and a frame buffer (not shown), both of which may be integrated within the display component itself.

Both the Keypad and Controls and Display components, which may be conventional in nature, interface directly with the Processor 106 through general I/O (e.g., I/O Bus). Typically, such devices communicate with the microprocessor through means of interrupt requests (IRQ). Both the Keypad and Controls and Display components are available from a variety of vendors. Examples include Sharp, Toshiba, Citizen of Japan, Samsung of South Korea, and Hewlett-Packard of Palo Alto, Calif. More customized displays are available from Displaytech, Inc. of Longmont, Colo. For an embodiment that does not need to interact with users, such as a surveillance camera, the foregoing components may be eliminated.

Additionally for a camera embodiment, it is desirable for the device to include an interface for standard peripheral devices, such as a detachable flash device. This may be provided by Hot Shoe (Accessory) Interface 110, which is a general I/O port that may comprise a serial interface of a conventional design that the camera uses to interface to its accessories via the Hot Shoe Interface. In this manner, a flash accessory can be clipped onto the camera via the Hot Shoe Interface for added illumination.

The Hot Shoe Interface 110 combines a Serial Peripheral Interface (SPI) with a multiplexed I/O bus which provides a plug-and-play interface to a family of accessories. These accessories may include, in addition to a flash unit, a wireless holster for cellular (e.g., Motorola) phones, extra film backs for compatibility with format digital film (e.g., Sony Memory Stick or SmartMedia), a USB cradle, an RJ-11 modem cradle, a wireless cellular module, extender cables, and the like. In the currently-preferred embodiment, the interface is based on the $I^2C$-standard serial interface, which supports logic allowing the device to sense $I^2C$-compatible devices that are attached to the port. $I^2C$, which stands for Inter IC Communication, is a serial bi-directional communication protocol created by Philips Semiconductor (a subsidiary of Philips Electronics, based in The Netherlands) and is used for communication between integrated circuits. Most systems have one master and several slaves that communicate using only two wires. Every device has its own identification code. If that code is sent by the master, only that device will respond with an acknowledgement. After the acknowledgement, the data to be communicated is sent or received by the master. Further information about the $I^2C$ communication protocol is available from Philips Electronics of The Netherlands. As with the Keypad and Controls 108 and Direct View Display or Viewfinder 109, the Hot Shoe Interface 110 itself is not required for implementing the image capturing and processing methodology of the present invention. In the specific embodiment of a consumer product such as a camera, though, these components typically would be included.

The system 100 includes Digital Film Flash Memory 111, which serves as the "digital film" for the system for storing compressed images. The Flash Memory 111 may comprise available flash memory removable media, such as CompactFlash, DataFlash, and Sony Memory Stick, typically in a 16 MB or larger size. Available vendors for flash memory include, for example, SanDisk of Sunnyvale, Calif. or Sony of Japan. Alternatively, the Flash Memory 111 may be affixed directly (i.e., non-removable) to the system 100. In such an embodiment, the additional bulk associated with a removable media cartridge holder and its accompanying interface may be avoided. Those skilled in the art will appreciate that the system 100 may incorporate other non-volatile memory configurations and designs that readily accommodate the image capture and processing methodology of the present invention. In general, for a consumer device embodiment, one should choose media that accommodates on the order of 100 compressed images or more.

The camera embodiment is powered by a single CR-123 lithium battery (not shown), provided with instant-on capability. Due in part to the distributed image processing approach of the present invention (presented below), the camera has significant power savings over other camera designs. This gives the device not only a size and weight advantage over other cameras but also a battery life advantage.

For connectivity, the system includes a wireless holster, a USB cradle, and a modem cradle. The wireless holster physically connects the camera to a cellular phone (e.g., Motorola cellular phone) and interfaces the Hot Shoe Interface to the phone's external accessory plug. The camera can be easily pulled out of the holster for use and clipped back in for transmission. Detection of the holster and phone signal is automatic to allow for hands-free transmission and there is no risk of corruption due to interruption by either loss of signal or unclipping. The camera clips into the USB cradle through the Accessory Hot-Shoe Interface 110 to provide rapid photo interchange to a personal computer equipped with a standard USB port. The USB cradle acts as a USB slave device and therefore requires no batteries or power supply for operation and instead draws its power from the PC. The camera can also clip into a modem cradle through the Hot Shoe Interface. The modem cradle allows the camera to transmit images to a PhotoServer module (operating on system 150, described below) via a land line connection (e.g., 33.6 KBps) via a standard RJ-11 phone jack. The modem cradle is powered by the battery in the camera.

The specifications for the currently-preferred camera embodiment may be summarized as follows.

TABLE 1

Miniature Wireless Digital Camera Specifications:

| | |
|---|---|
| Sensor: | 1.3 Mega-Pixel Color CMOS |
| Optics: | 18 mm Fixed Focal Length, Fixed Aperture |
| Exposure Control: | Automatic, Macro Mode, Indoor/Outdoor Mode |
| Processor: | ARM 32-bit RISC |
| Chipset: | Image Processor (Lightsurf PhotonOne) |
| Memory: | 4Mbytes DRAM + 128Kbytes SRAM |
| Digital Film: | 16Mbytes Internal Flash Film |
| File Format: | Progressive Photograph Format (PPF) |
| Wireless Protocol: | Communication protocol, such as packet-based TCP/IP, WAP, or the like |
| Battery: | CR-123 |
| Accessory Interface: | Accessory Hot-Shoe |
| Accessories: | Flash Unit, Extra Film Back, Motorola Cellular Holster, USB Cradle, Modem Cradle |

B. Basic Computer Hardware (e.g., for Computers that May "Host" Add-on Devices)

Figure 1B:
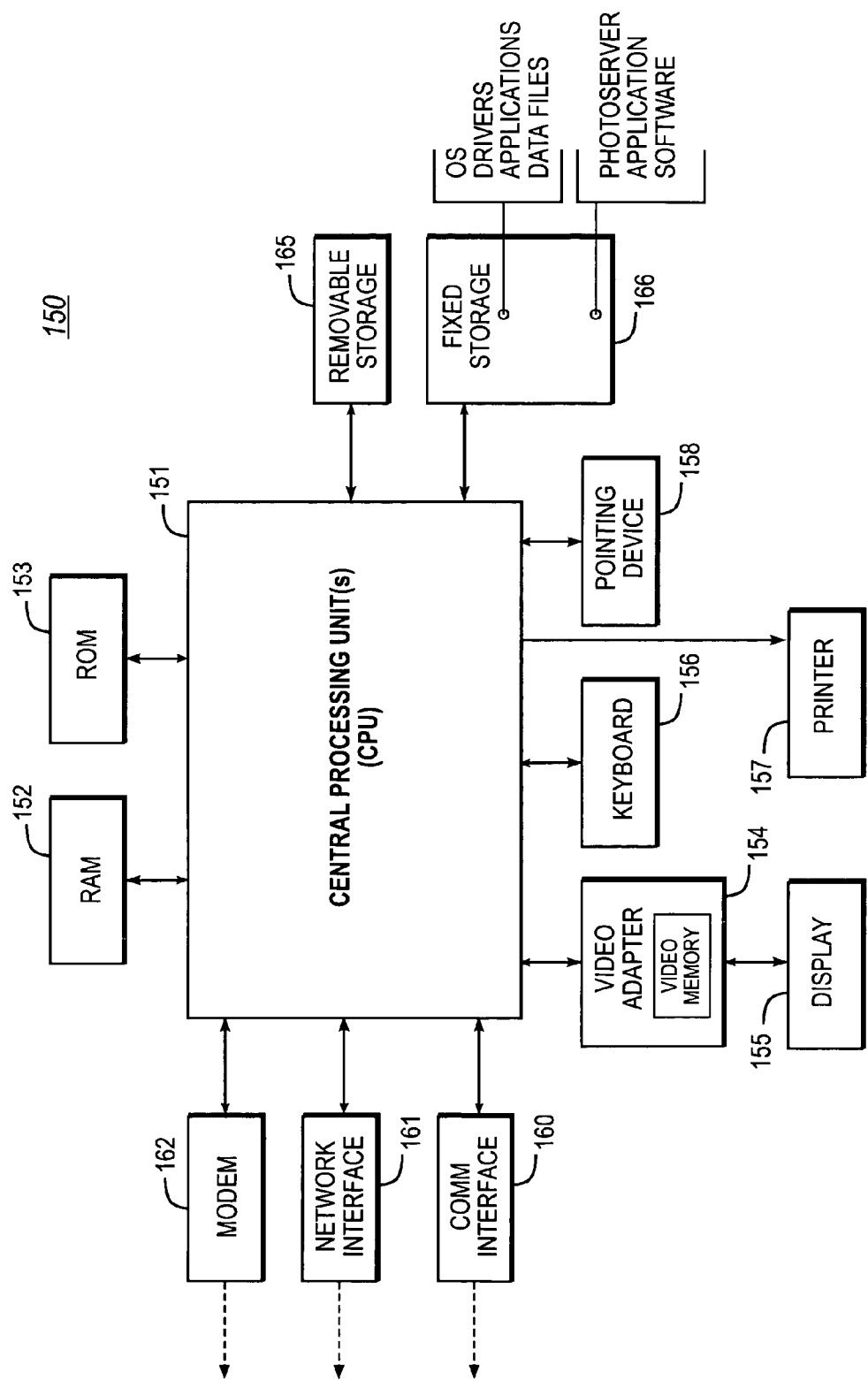
FIG. 1B is a block diagram illustrating a digital computer that may interoperate with the digital camera device of FIG. 1A.

Portions of the present invention may be implemented on a conventional or general-purpose computer system, such as an IBM-compatible personal computer (PC) or server computer that may host the above-described digital camera device (e.g., via USB or RS-232 connectivity). FIG. 1B is a very general block diagram of an IBM-compatible system 150. As shown, system 150 comprises a central processor unit(s) (CPU) 151 coupled to a random-access memory (RAM) 152, a read-only memory (ROM) 153, a keyboard 156, a pointing device 158, a display or video adapter 154 connected to a display device 155, a removable (mass) storage device 165 (e.g., floppy disk), a fixed (mass) storage device 166 (e.g., hard disk), a communication port(s) or interface(s) 160, a modem 162, and a network interface card (NIC) or controller 161 (e.g., Ethernet). Although not shown separately, a real-time system clock is included with the system 150, in a conventional manner.

CPU 151 comprises a processor of the Intel Pentium® family of microprocessors. However, any other suitable microprocessor or microcomputer may be utilized for implementing the present invention. The CPU 151 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 152 serves as the working memory for the CPU 151. In a typical configuration, RAM of sixteen megabytes or more is employed. More or less memory may be used without departing from the scope of the present invention. The read-only memory (ROM) 153 contains the basic input/output system code (BIOS)—a set of low-level routines in the ROM that application programs and the operating systems can use to interact with the hardware, including reading characters from the keyboard, outputting characters to printers, and so forth.

Mass storage devices 165, 166 provide persistent storage on fixed and removable media, such as magnetic, optical or magnetic-optical storage systems, flash memory, or any other available mass storage technology. The mass storage may be shared on a network or it may be a dedicated mass storage. As shown in FIG. 1B, fixed storage 166 stores a body of program and data for directing operation of the computer system, including an operating system, user application programs, driver and other support files, as well as other data files of all sorts. Typically, the fixed storage 166 serves as the main hard disk for the system and stores application software implementing a PhotoServer component (PhotoDesktop, when implemented on a desktop computer), which may operate to process images uploaded from digital cameras (e.g., digital camera device 100).

In basic operation, program logic (including that which implements methodology of the present invention described below) is loaded from the storage device or mass (fixed) storage 166 into the main (RAM) memory 152, for execution by the CPU 151. During operation of the program logic, the system 150 accepts user input from a keyboard 156 and pointing device 158, as well as speech-based input from a voice recognition system (not shown). The keyboard 156 permits selection of application programs, entry of keyboard-based input or data, and selection and manipulation of individual data objects displayed on the display device or screen 155. Likewise, the pointing device 158, such as a mouse, track ball, pen device, or the like, permits selection and manipulation of objects on the display screen. In this manner, these input devices support manual user input for any process running on the system.

The computer system displays text and/or graphic images and other data on the display device 155. The display device 155 is driven by the video adapter 154, which is interposed between the display device 155 and the system 150. The video adapter 154, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 150, may be obtained from the printer 157, or other output device. The printer 157 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 161 connected to a network (e.g., Ethernet network), and/or a modem 162 (e.g., 56K baud, ISDN, DSL, or cable modem), examples of which are available from 3Com of Santa Clara, Calif. The system 150 may also communicate with local occasionally-connected devices (e.g., serial cable-linked devices) via the communication ("comm") interface 160, which may include an RS-232 serial port, a Universal Serial Bus (USB) interface, or the like. Devices that will be commonly connected locally to the comm interface 160 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

The above-described system 150 is presented for purposes of illustrating the basic hardware underlying desktop and server computer components—"host" components—that may be employed in the system of the present invention. For purposes of discussion, the following description will present examples in which it will be assumed that there exists a "host" device which is to host a client device. The present invention, however, is not limited to any particular environment or device configuration. In particular, a client/host distinction is not necessary to the invention, but is used to provide a framework for discussion. Instead, the present invention may be implemented in any type of computer system or processing environment capable of supporting the methodologies of the present invention presented in detail below.

C. Basic System Software

Figure 2:
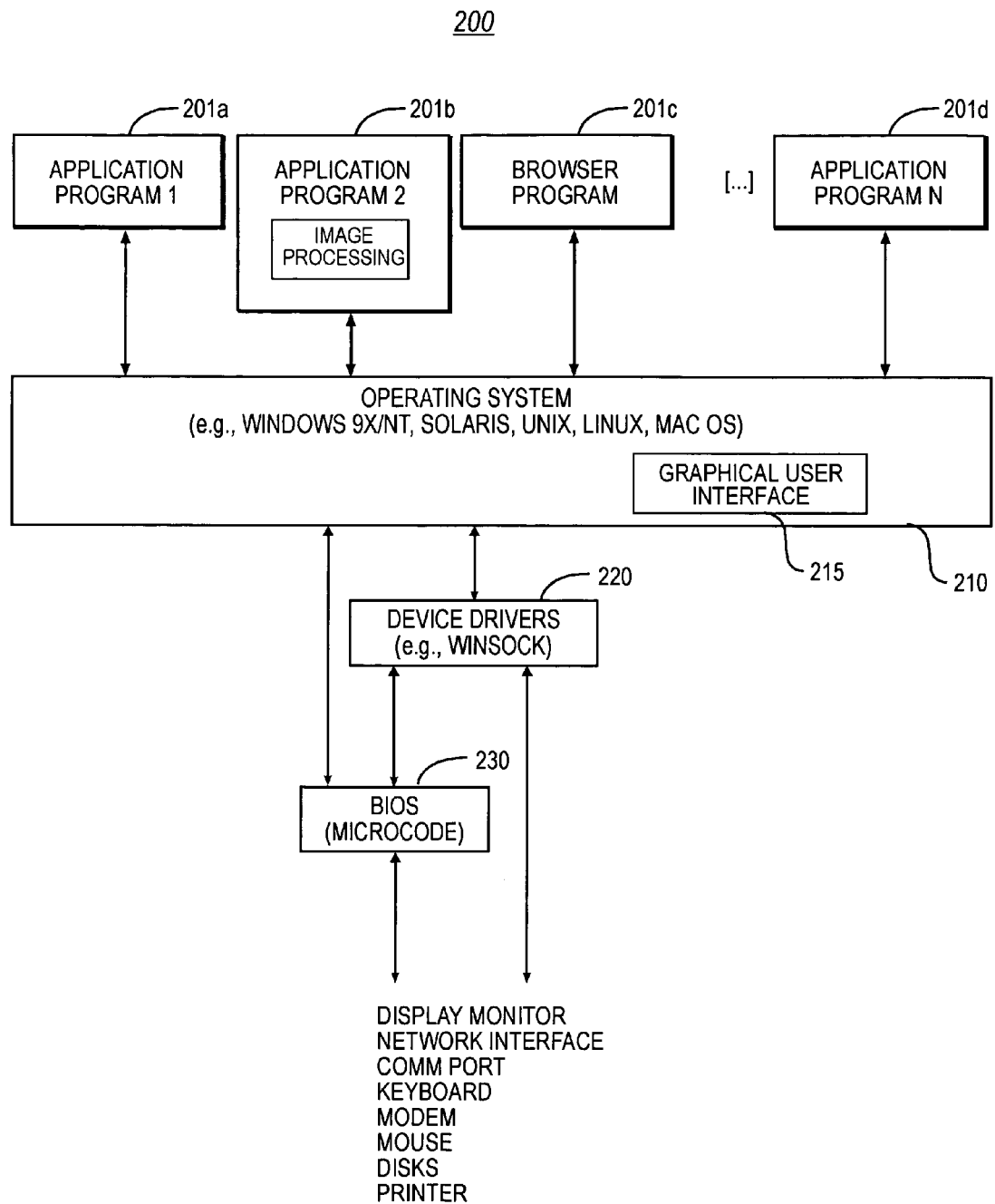
FIG. 2 is a block diagram of a software system suitable for controlling the computer of FIG. 1B.

Illustrated in FIG. 2, a computer software system 200 is provided for directing the operation of the computer system 150. Software system 200, which is stored in system memory (RAM) 152 and on fixed storage (e.g., hard disk) 166, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*), including image processing software, may be "loaded" (i.e., transferred from fixed storage 166 into memory (RAM) 152) for execution by the system 150.

Software system 200 includes a graphical user interface (GUI) 215, for receiving user commands and data in a graphical (e.g., "point-and-click") fashion. These inputs, in turn, may be acted upon by the system 150 in accordance with instructions from OS 10, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver) and the system BIOS microcode 230 (i.e., ROM-based microcode), particularly when interfacing with peripheral devices. OS 210 can be provided by a conventional operating system, such as Microsoft® Windows 9x, Microsoft® Windows NT, or Microsoft® Windows 2000, all available from Microsoft Corporation of Redmond, Wash. Alternatively, OS 210 can also be an alternative operating system, such as IBM OS/2 (available from IBM of Armonk, N.Y.) or Macintosh OS (available from Apple Computer of Cupertino, Calif.).

The following description focuses on an application/driver "uploader" system of the present invention implemented in a first device (e.g., system 100 described above), thereby allowing that device to inject an object (e.g., application or driver) into a second device (e.g., system 150 described above). The uploader system, when implemented in the system 100, is a software-implemented system stored in Program Code Flash Memory 107 for execution by the Processor 106, after loading into System Memory 105. If desired, however, the application/driver "uploader" system of the present invention may be implemented in an ASIC (application-specific integrated circuit). The application/driver to be injected will reside in module 111 or module 107 of FIG. 1A. The communications (TCP/IP or PPP) would occur through module 110 of FIG. 1A or through a COMM INTERFACE from the 32-Bit RISC ARM processor (this would be a module such as 160 on FIG. 1B attached to the ARM processor). The COMM interface would typically include an RS-232 UART (Universal Asynchronous Receiver Transmitter) module.

Application/Driver "Uploader" System Providing Methodology for Dynamic Uploading and Execution of Applications and Drivers Between Connected Devices A. Introduction The following description will present examples in which it will be assumed that there exists a first device that is to be connected to a second device(s), such as a digital camera device (e.g., system 100) connected to a computing device (e.g., computer system 150). To simplify the description, one device will be referred to as a "client" device and the other device will be referred to as a "host" device. For instance, in describing the digital camera embodiment below, the digital camera device is considered the "client" device and the device(s) that the digital camera device connects to is considered the "host" device(s). As previously discussed, a client or host distinction is neither necessary to the invention nor even necessarily desirable, but merely provides a framework for discussion. The focus of the following description, therefore, is not focused on a particular hardware configuration. Not only may the present invention be applied to a variety of disparate configurations, but in fact the present invention is most advantageous when applied to disparate configurations. The following description will focus on the application of dialog and negotiation among two or more devices, in accordance with the present invention. The devices themselves, however, may be configured in a variety of hardware configurations (e.g., according to the particular needs of the user and/or vendor). Thus, the following description is for the purposes of illustration and not limitation.

B. Design Considerations

In accordance with the present invention, the following approach is adopted for supporting the dynamic uploading and execution of applications and drivers between (temporarily or permanently) connected devices. The device which is to be hosted (e.g., the "client" device) initially probes its environment to determine which device or devices it is attached to (e.g., the "host" device(s)). Once it has correctly discerned the relevant host or target device(s), the client device includes the capability of immediately sending out (i.e., uploading) a particular driver or application (i.e., object or file of interest) for placement, and ultimately execution, at the host device. Once the particular object or file of interest has been "injected" into the host device and is executing, the client device may simply revert to a "listening mode" in which it waits to be told what to do (i.e., receive commands from the application or driver which is now executing at the host device).

This approach is particularly well-suited for devices which serve as "add-on" devices (clients) to other devices (hosts) that are "smarter," for instance, including more processing capability and/or memory. In this scenario, the client device enters into a dialog with a device with more resources for the purposes of harnessing the resources of the host device for operating the client or add-on device. The client device is, using this approach, able to start running (i.e., driver-directed operation) immediately upon attachment to a host device that can be identified.

Against this backdrop, one must remain cognizant of the constraints presented by existing devices. One must take into account the need for backward compatibility, including wireline, as well as wireless, compatibility, so that a particular approach does not lock out any particular class of devices. By the same token, the approach should provide forward compatibility, so that the approach is prepared for future devices.

Therefore, the approach adopted by the present invention is designed to be easily extended to support multiple host devices as well as multiple communication media. Upon probing its environment, the client device identifies all relevant host devices over all relevant communication media. Then, the client device enters into a dialog with each particular host device. In a manner similar to that described above for a single host device, the client device uploads appropriate application or driver software, as appropriate, for each identified host device. Upon entering the listening mode, the client device can respond to any and all requests from the multiple host devices.

For purposes of backward and forward compatibility, the preferred embodiment of the present invention supports TCP/IP protocol. "TCP/IP" or "Transmission Control Protocol/Internet Protocol" is the suite of communications protocols used to connect devices on the Internet. TCP/IP uses several protocols, the two main ones being TCP and IP. TCP enables two hosts to establish a connection and exchange streams of data. The protocol guarantees delivery of data and also guarantees that packets will be delivered in the same order in which they were sent. IP protocol, on the other hand, deals only with packets—that is, the individual pieces of a message transmitted over a packet-switching network. TCP/IP is built into the UNIX operating system and is used by the Internet, making it the de facto standard for transmitting data over networks. Because TCP/IP has widespread support and can also run over many different types of physical connections, it is adopted as the preferred connectivity protocol in the preferred embodiment. In this manner, the preferred embodiment can leverage the pre-existing low-level protocols that are already supported by a multitude of devices.

In addition to TCP/IP, the present invention embraces a file-based approach to object storage and handling. A "file" is a collection of data or information that has a name, or "file name." Common examples of files include executable files which contain program commands in an executable format, text files which contain human-readable textual data, and binary files which contain data or instructions in binary format. A file-based technique is a well-known method for storing and transmitting information, including applications and drivers. Therefore, in the preferred embodiment, a file-based approach is adopted, including use of common file names, which are portable across a variety of different systems.

C. General System Modules

Figure 3:
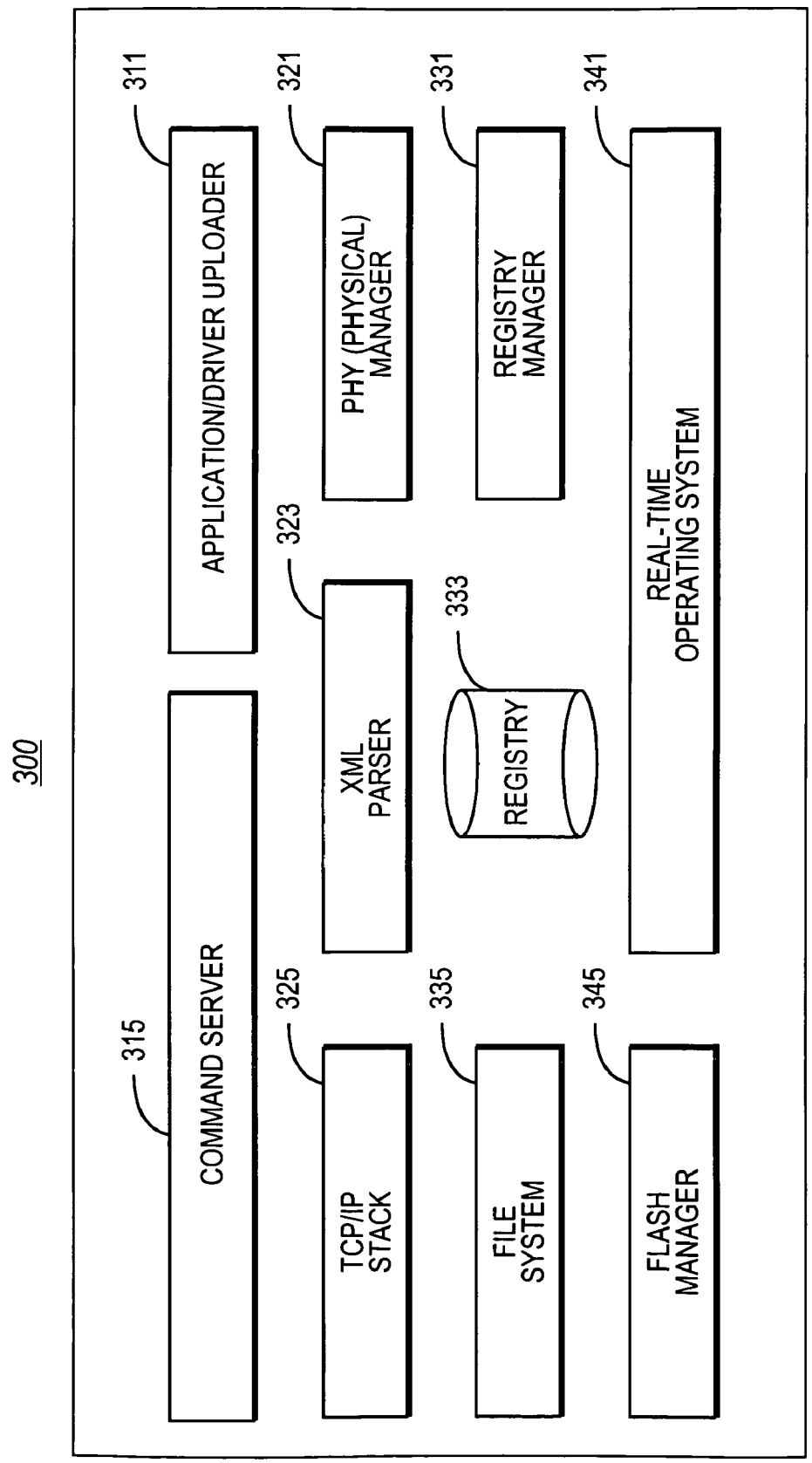
FIG. 3 is a block diagram of an application/driver uploader system of the present invention, which is embodied in the digital camera device of FIG. 1A.

FIG. 3 is a high-level block diagram illustrating an application/driver "uploader" system of the present invention. As described above, the system 300 includes software modules that, in a preferred embodiment, are software or ASIC (application-specific integrated circuit) modules implemented on one device (e.g., digital camera device or system 100) that is to be connected to another (host) device (e.g., computing device or system 150).

The core engine or workhorse module for the system 300 is in the application/driver uploader (engine) module 311. This module serves to determine what is the device(s) (i.e., host(s)) that the current device (i.e., client) is connected to. Based on this determination, the module is also responsible for coordinating the activities of (1) initiating a communication session with the host(s), (2) uploading the actual object of interest (e.g., driver or application file) onto the host device, (3) invoking execution of that object, and (4) properly terminating the communication session, as desired.

The application/driver uploader module 311 coexists with another high-level module, the command server module 315. Once the uploader module 311 has completed its overall task of injecting an application or driver of interest, the command server module 315 serves to wait for requests/commands from the particular application or driver that have just been uploaded to the host device(s), so that the client device itself may operate under control of the host device(s), namely, operating in response to a given command issued from a driver executing at the host device(s).

To support the just-described high-level functionality of the uploader module 311 and the command server module 315, the system 300 includes lower-level modules. Therefore, at the next to lower level, the system 300 includes a PHY (physical) manager 321. This module serves as an "identifier" supporting module for the uploader module 311. In particular, the PHY manager 321 determines which specific device (i.e., host(s)) is physically connected to the client device, at a given point in time (e.g., upon first connect). Here, the PHY manager 321 is responsible for the initial physical connection, be it wireline or wireless. In operation, the PHY manager 321 sets various internal flags for indicating which host device(s) it has uncovered as being physically connected to the client device. These flags are reflected in a registry 333, which is a repository or database storing configuration information. Other modules of the system 300, including the uploader module 311, may extract information from the registry 333 to determine what flags have been set by the PHY manager 321, for determining which host devices are currently connected. The particular host-specific steps required for uploading a driver of interest to the host device may be discerned based on the flags set by the PHY manager 321.

The uploader module 311 and the command server module 315 also employ an XML parser 323. The XML parser 323 provides an internal communication protocol for issuing commands and transmitting data. In the currently-preferred embodiment, all of the commands and accompanying data transmitted (e.g., from driver to client device, or vice versa) are packaged using XML syntax, which provides an extensible tag-based approach to wrapping data. "XML" or "Extensible Markup Language" is a specification developed by the World Wide Web Consortium, an international consortium of companies involved with the Internet and the Web. XML is a pared-down version of SGML (Standard Generalized Markup Language), which is designed especially for Web documents. It allows designers to create their own customized tags, enabling the definition, transmission, validation, and interpretation of data between applications and between organizations. For further description of XML, see, e.g., Extensible Markup Language (XML) 1.0 specification which is available from the World Wide Web Consortium (www.w3.org), the disclosure of which is hereby incorporated by reference. The specification is also currently available on the Internet at http://www.w3.org/TR/REC-xml.

The following two command and response pairs are examples of the XML syntax.

Command: Load Application

<LoadApp>
   <name>Application Name</name>
   <bin>
   <size>1234</size>
   (binary data here)
   </bin>
</LoadApp>

Response: Load Application

<LoadAppR>
   <status>0</status>
   <handle>5678</handle>

</LoadAppR>

Command: Activate Application

<ActivateApp>
   <handle>5678</handle>
   <priority>1</priority>
</ActivateApp>

Response: Activate Application

<AcxtivateAppR>
   <status>0</status>
</ActivateAppR>

As shown, XML may be used to provide tag-delimited commands and associated data.

As an additional advantage, XML syntax is supported by a variety of high-level servers. As it can be expected that client devices will often interact with servers across the Internet, XML serves as a "glue" logic supporting communication between these devices. By adopting XML syntax, a given client device may communicate with a high-level server in a more efficient manner, as XML-wrapped data may be transmitted between devices without the need to be converted or translated before transmission.

Also at the level of the XML parser 323, the system 300 includes a TCP/IP stack 325 (i.e., implementing the protocol layers that define communication over the Internet). This module allows the use of standard TCP and IP protocols, thereby providing a socket-based communication interface that is highly compliant with available operating systems (e.g., UNIX, Windows, Linux, Macintosh, PalmOS, and the like) across multiple hardware platforms. By adopting TCP/IP, the client device can leverage existing connectivity protocols that are commonly found on most devices. In the currently-preferred embodiment, the TCP/IP stack 325 is provided as InterNiche Portable TCP/IP Protocol Stack, version 1.6, available from InterNiche Technologies, Inc. of San Jose, Calif. (a data sheet is currently available at http://www.iniche.com/download/datasheets.htm).

At the next to lower level, the system 300 includes a registry manager 331 which stores state information for the system 300 in a registry 333. Recall that the PHY manager 321 sets various status flags for defining the current environment that the client device is connected to. The flags are maintained as name/value pairs (e.g., Windows-like registry settings) in the registry 333, under control of the registry manager 331. The registry 333 comprises a hierarchically-organized "tree" of "keys" (i.e., intermediate nodes) and "values" (i.e., leaf modes consisting of name/value pairs that may be defined). Within the registry 333, certain keys at the root of the hierarchy are considered well-known and provide primary division of the tree. Intermediate keys are used to further organize the registry; the very existence of certain of these intermediate nodes has semantic meaning. The leaf nodes, i.e., "named values", are the primary items of focus. In this manner, the registry 333 serves as a repository indicating what various configuration settings, such as TCP/IP configuration settings, are required to be set in order to communicate with a particular host device.

The registry implementation in the currently-preferred embodiment supports named-value leaves of the following types:

(1) UI32, which is 32-bit unsigned data. Some or all of these 32 bits may be used and/or interpreted as seen fit by the software using the registry, e.g., these 32 bits might be treated as a signed 32-bit value, or perhaps, an unsigned 8-bit value, or the like.

(2) ASCII strings, which are 8 bits/character ASCII, terminated by the "null character", '\0'.

(3) UNICODE strings, which are 16 bits/char Unicode, terminated by the "Unicode null character", L'\0'.

(4) Arbitrary 8-bit binary data, the length of which is stored by the registry implementation.

The registry supports keys and named values, some of which are "permanent" and some of which are "transient". Permanent keys are stored in client devices in such a way that they "survive" between active power-on sessions. They are implemented in such a way that they are extremely durable over/through the most "user-abusive" (e.g., unplanned) power-downs. Transient keys are only maintained for a single power-on session. They are typically few in number, and are most often seen marking "current" states/preferences. Additionally, the registry may define certain keys and values to be "read-only".

The system 300 includes its own a file system 335. This allows the system 300 to store its own applications, data, and other binary information. In the currently-preferred embodiment, this is implemented as a DOS-like (e.g., MS-DOS) or UNIX-like file system, for providing local storage on the client device. The file system 335 may be supplied by a real-time operating system, such as a digital camera operating system; or, alternatively, it may be supplied as a stand-alone subsystem, independent of the underlying operating system. In the currently-preferred embodiment, the file system 335 is USFiles® File System (version 3.00.02), available from U.S. Software of Hillsboro, Oreg.

To support nonvolatile flash memory storage, the file system 335 may work in conjunction with a lower-level module, the flash manager 345 (or other persistent storage media, such as hard disk). The flash manager 345 includes logic appropriate for converting file information into a format appropriate for nonvolatile storage. In particular, in the preferred embodiment, it is desirable to store application drivers and related information in flash memory. Thus, the flash manager 345 serves as a module for managing the hardware resources available for storing files.

Finally, the system 300 includes a real-time operating system 341. Operating systems, which perform basic system tasks, provide an interrupt-driven mechanism for servicing system-level requests. In the currently-preferred embodiment, the real-time operating system is provided by the eCos operating system (Version 1.2.1), provided by Red Hat, Inc. of Durham, N.C. Version 1.3.1 is also available.

D. Detailed Description of Registry

The registry defines a registry key for characterizing communication and connectivity to host device(s), the CONNECT/commdev key, as follows.

Key: CONNECT/commdev

Type: Key

Persistent: Yes

Application Access: Read-only

Maintenance Server Access: Read/Write/Create/Delete

Sub-keys are specified to provide the client device with specific connectivity option information. In particular, the connectivity management function of a client device uses the existence of sub-keys of CONNECT as a "table" of possible communicating devices that may be connected from time-to-time to the client device. This connectivity management function monitors for the attachment (or "arrival") of the devices described by these sub-keys. For example, a client camera device may be designed for connection to an XYZ Corp. USB cradle and an XYZ Corp. model 560 cellular telephone. In this case, there might be sub-keys, CONNECT/XyzUsb-Cradle and CONNECT/XyzCell560, defined. Server maintenance access provides access to certain keys and values from "remote servers" via a secure communications protocol. This access allows for post-factory configuration and/or "final user" (re)provisioning of client devices.

The foregoing sub-keys or additional keys, as described below, provide necessary information to the client device on how to detect the attachment of one of these devices and, after having detected such devices, how to utilize the possible connectivity these devices may provide.

Key: CONNECT/commdev/PHY

Type: Key

Persistent: Yes

Application Access: Read-only

Maintenance Server Access: Read/Write/Create/Delete

This sub-key of the CONNECT/commdev key provides the client device with information germane to the detection of the attachment of the commdev. This attachment is detected using a response-matching approach, where a certain sequence of data is transmitted on the client's physical communications link and then responses to each are compared against known responses for a commdev. The sub-keys, CONNECT/commdev/PHY/QUERY and CONNECT/commdev/PHY/RESPONSE, organize these queries/responses.

Key: CONNECT/commdev/PHY/QUERY

Type: Key

Persistent: Yes

Application Access: Read-only

Maintenance Server Access: Read/Write/Create/Delete

This sub-key of a key CONNECT/commdev/PHY organizes the queries needed to "sense" the attachment of commdev.

Values: CONNECT/commdev/PHY/QUERY/n

Type: BINARY

Persistent: Yes

Application Access: Read-only

Maintenance Server Access: Read/Write/Create/Delete

These values are individual query-byte sequences used in the "sensing" of commdev. Each is ordered from 0 upward. The query-byte sequences are output to "sense" possible attachment of commdev. Normally, for each value CONNECT/commdev/PHY/QUERY/n, there is usually a corresponding value CONNECT/commdev/PHY/RESPONSE/n. If there is no such corresponding value, or the value is zero length, then the "match" is "instantaneous"; the client device then proceeds to the next, if any, query/response pair.

Key: CONNECT/commdev/PHY/RESPONSE

Type: Key

Persistent: Yes

Application Access: Read-only

Maintenance Server Access: Read/Write/Create/Delete

This sub-key of a key CONNECT/commdev/PHY organizes the responses needed to "sense" the attachment of commdev.

Values: CONNECT/commdev/PHY/RESPONSE/n

Type: BINARY

Persistent: Yes

Application Access: Read-only

Maintenance Server Access: Read/Write/Create/Delete

These values are individual response-byte sequences used in the "sensing" of commdev. Each is ordered from 0 upward. The response-byte sequences are looked for after the output of a query-byte sequence to "sense" possible attachment of commdev.

Value: CONNECT/commdev/PHY/Id

Type: UI32

Persistent: Yes

Application Access: Read-only

Maintenance Server Access: Read/Write/Create/Delete

This UI32 value is used to uniquely identify a commdev. The client device vendor administers this "global numberspace", assigning a range of numbers to client device technology licensees. These licensees use them in their implementations to identify the variety of connectivity-providing devices that their client devices sense/support.

Value: CONNECT/commdev/PHY/EffectiveBaud

Type: UI32

Persistent: Yes

Application Access: Read-only

Maintenance Server Access: Read/Write/Create/Delete

This UI32 value is used to indicate the approximate expected, effective speed in bytes/second of a commdev's raw data channel. This attempts to provide a speed metric based on information known a priori about the underlying "data service" a commdev typically can provide.

Value: CONNECT/commdev/PHY/Cost

Type: UI32

Persistent: Yes

Application Access: Read-only

Maintenance Server Access: Read/Write/Create/Delete

This UI32 value is used as a BYTE, where 0 is the "lowest cost" and 255 is the "highest cost". This "cost" indicates how "cheap" the commdev's physical bearer is, i.e., there is no (or an extremely trivial) "per minute" cost to use the communications facility. This attempts to provide a "generic" cost metric that may be used by certain client devices to aid in the implementation of possible user preferences regarding issues such as quality of images uploaded over different "cost" links.

In the registry, a CONNECT/CURR/PPP key is used to track certain current run-time data, related to the client device's PPP link. The below-listed sub-key values may be stored.

Value: CONNECT/CURR/PPP/IpAddrLocal

Type: UI32

Persistent: No

Application Access: Read/Write/Create/Delete

Maintenance Server Access: Read-only

This value is the client device's current IP address in "network order". If the value is 0x00000000, it may be assumed that the client device has not been able to obtain an IP address. The client device application software, specifically the connectivity management function, creates and writes/maintains this value.

Value: CONNECT/CURR/PPP/IpAddrRemote

Type: UI32

Persistent: No

Application Access: Read/Write/Create/Delete

Maintenance Server Access: Read-only

This value is the far peer device's current IP address in "network order". Typically, this would not be the client-supporting server, but rather the Internet host with which the current PPP link is established. If the value is 0x00000000, it may be assumed that the client device has not been able to obtain an IP address. The client device application software, specifically the connectivity management function, creates and writes/maintains this value.

Value: CONNECT/CURR/PPP/Mtu

Type: UI32

Persistent: No

Application Access: Read/Write/Create/Delete

Maintenance Server Access: Read-only

This value is the negotiated PPP Maximum Transmission Unit (MTU) for the currently-established PPP link. If there is no established PPP link, this value should be 0. The client device application software, specifically the connectivity management function, creates and writes/maintains this value. Currently, this is not a required value. The client device should not create and/or maintain this value.

A CONNECT/commdev/NET key is used to organize parametric information related to Internet communications, for layers above PPP.

Value: CONNECT/commdev/NET/Dns

Type: Key

Persistent: Yes

Application Access: Read-only

Maintenance Server Access: Read/Write/Create/Delete

This key organizes the specification of zero, one, or more Domain Name Server machines on the Internet, which should be used by the IP stack to resolve fully-qualified host names. If this sub-key is not present, it is to be interpreted that no DNS services are needed in the communication configuration specified by CONNECT/commdev. If this key exists but has no values (specifying DNS IP addresses), the system interprets this to indicate that DNS information is required and that it should be obtained using DHCP.

Value: CONNECT/commdev/NET/Dns/n

Type: CLsStr

Persistent: Yes

Application Access: Read-only

Maintenance Server Access: Read/Write/Create/Delete

This/these values, 0 thru n, are value data (CLsStr data) that specify the IP address (in "dot form" address, e.g., "204.30.31.5") of a Domain Name Server (DNS) that the client device should preferably use in mapping host names to IP addresses. These values only exist in the communications environment described by CONNECT/commdev only if the DNS address(es) must be specified a priori, e.g., there is no dynamic DNS information available during PPP establishment time.

Value: CONNECT/commdev/NET/TcpMss

Type: UI32

Persistent: Yes

Application Access: Read-only

Maintenance Server Access: Read/Write/Create/Delete

This UI32 value is the maximum size of a TCP transmission segment.

Value: CONNECT/commdev/NET/TcpWindow

Type: UI32

Persistent: Yes

Application Access: Read-only

Maintenance Server Access: Read/Write/Create/Delete

This UI32 value is the size of the TCP window in bytes.

Value: CONNECT/commdev/NET/TcpKeepAlive

Type: UI32

Persistent: Yes

Application Access: Read-only

Maintenance Server Access: Read/Write/Create/Delete

This UI32 value is used as a BOOL, where 0 is FALSE and 1 is TRUE. A value of 1 indicates that the client device will generate "idle" TCP PDUs to keep any TCP connections up.

E. Detailed Description of PHY Manager

The PHY manager 321 will now be described in further detail. The PHY manager 321 probes for new devices over what the registry 333 lists as the then-current communication medium. Communication media may include, for instance, wireless, serial (RS-232) wired, USB, or the like. Depending on the hardware configuration of the client device, it is possible to have multiple communication media active simultaneously. Typically, the registry 333 includes a default (factory preset) configuration registry entry specifying the initial communication medium (or media) available upon initial power up of the client device. For this default connectivity entry and other connectivity entries, the registry 333 includes corresponding default communication rates (baud rates) and corresponding handshake protocols (command set). Using this information, the PHY manager 321 may execute an initial sequence of handshake commands and comparing any response received to a list of known responses for identifying a particular host device. For example, to elicit devices that may be connected via RS-232, the PHY manager 321 may begin by sending out corresponding sequences of initialization commands (e.g., AT commands), at different baud, for eliciting a response from any potential host that is connected. Probing for host devices continues until all known potential host devices have been enumerated. Based on what is found, the PHY manager 321 updates the registry 333 with information describing which host devices the client device is currently connected to.

In order to illustrate how the PHY manager 321 determines what host device(s) is connected to the device under use, consider the following two examples which illustrate the process used to determine if a host is connected. Both examples will use a serial RS-232 connection to transmit data.

Example #1

Windows NT RRAS Server

This connection is set to emulate a serial port-to-serial port PC-to-PC connection. The first item is to set the serial port to the proper data rate. For this case, 115200 baud is the default. The next step is to send out a text string to the PC RAS Host. The following is the transmission and reply for a connection session.

Send: CLIENT[carriage-return]

Reply: SERVER[carriage-return]

Now, the process may negotiate a PPP connection with the Windows NT Server. PPP refers to Point-to-Point Protocol, a well-known method for transmission of IP packets over serial lines; see, e.g., RFC 1661: The Point-to-Point Protocol (PPP), available from the Network Working Group, the disclosure of which is hereby incorporated by reference. RFC 1661 is currently available via the Internet at: http://www.freesoft.org/CIE/RFC/1661/index.htm.

Example #2

Modem Mode of Cell Phone with Internal PPP Server

This mode emulates a standard modem AT connection. For this case, the default serial port rate is 38400 baud. The following characters are sent on the serial port to determine that a modem-compatible device is connected.

Send: AT[carriage-return]

Reply: OK[carriage-return]

The next step is to negotiate a PPP session with the internal PPP Server. Refer to the above-mentioned RFC 1661 for more information on negotiating a PPP session.

The PHY manager 321 is also responsible for ensuring that any other low-level connectivity is met such that a state of TCP/IP communication is reached. This is required because TCP/IP may not in fact be operating at the point when the client device first initiates communication. For instance, in normal RS-232 serial communication and USB communication, TCP/IP will not yet be running. Although TCP/IP configuration may not be yet running at the outset, Point-to-Point Protocol (PPP) may be employed to ensure TCP/IP connectivity, in a manner similar to that commonly done with dial-up Internet connections. PPP (Point-to-Point Protocol), as described above, is a protocol defined in RFC 1661 for communication between two computers using a serial interface, such as a personal computer connected by a phone line to a server. For example, Internet Service Providers typically provide their users with a PPP connection so that the provider's server can respond to user requests, pass them on to the Internet, and forward requested Internet responses back to the users.

Use of PPP is made possible due to the fact that most hosts that support a TCP/IP stack will also support PPP within their TCP/IP stack. Accordingly, the client device can initiate a PPP session through well-known means, and thereupon request TCP/IP communication. Additionally, the client device is also capable of being a PPP server, and thereby accepting clients as well. All told, through use of the available PPP protocol, the client device can initiate TCP/IP connectivity, including determining an IP address for a given host device, even if TCP/IP connectivity does not exist at the outset. In this manner, the PHY manager 321 sets up a communication TCP/IP channel allowing the client device to communicate with the connected host device(s).

F. Detail Description of Application/Driver Uploader Module

The application/driver uploader module 311 will now be described in further detail. This module acts on the information elicited by the PHY manager 321, as maintained in the registry 333, in order to determine what tasks need to be performed, in regards to interoperating with host devices. Within the TCP/IP parameters stored for a given host, the registry 333 will maintain an IP address for that host. In the currently-preferred embodiment, the client device communicates as a TCP/IP client, not as a server. A port (logical connection) number is defined for the host device to listen on.

Once a TCP/IP communication session is open, the application driver may now be "injected" into the host device. Now, the client device opens the corresponding file that contains the appropriate application driver (file). This request is serviced by the file system 335. If the appropriate application driver exists and can be opened, the file system 335 returns a file handle to the application/driver uploader 311. The application/driver uploader 311 may now package the file for transmission across the established TCP/IP communication medium. In the currently-preferred embodiment, this is accomplished by a defined internal command sequence. At the conclusion of this portion of the process, the file of interest has been injected into the host device, with a corresponding file handle returned to the client device.

The file handle returned to the client supports important client-controlled functionality, thereby allowing the client device to access the file that has just been injected into the host device in a variety of ways. For example, returning this file handle to the client device will allow the client device to perform a variety of operations on that file as it resides at the host device, including starting up the file as an application or driver. In the currently-preferred embodiment, the file handle returned to the client device is any reference to that application which is supported by the host device's architecture. This may be, for instance, a file handle provided by the host device or a file name recognized by the host device.

The final step of the process is to actually invoke execution of the injected application or driver. In this particular injection scenario, therefore, the injected object is an executable file (or capable of triggering execution of a corresponding executable file). Therefore, it includes program code, for instance, machine instructions for a particular target processor or byte code instructions for a virtual machine (e.g., Java byte code instructions for executing a Java virtual machine at the host). Java is a well-known programming language specification, available from Sun Microsystems of Mountain View, Calif. Further description of the Java Language environment can be found in the technical, trade, and patent literature; see e.g., Gosling, J. et al., *The Java Language Environment*: A White Paper, Sun Microsystems Computer Company, October 1995, the disclosure of which is hereby incorporated by reference.

In the instance where the injected application or driver comprises byte code (e.g., Java byte code), that application or driver may target a potentially larger number of host devices (compared to a processor-specific executable, which supports a smaller number of potential host devices). Therefore, in the currently-preferred embodiment, the application or driver to be injected comprises a Java program, with the intended host, in a corresponding manner, supporting run-time operation of a corresponding virtual machine capable of executing the program byte code (e.g., Java Virtual Machine at the host device capable of executing the Java program code). Although use of Java for creating the application or driver allows one to potentially target a larger number of host devices, those skilled in the art will appreciate that the methodology of the present invention is equally applicable to client-to-host object injection in both byte code- and native machine code-supported environments.

To invoke execution, the client device issues a command which, when received by the host device, triggers execution of the just-injected application or driver. Based on the prior identification of the host device, the application/driver uploader 311 may retrieve from the registry 333 information indicating the appropriate command to issue for the identified host device. In the straightforward case, the host device may simply be instructed to begin execution of the injected application or driver. For some host devices, however, execution may have to be triggered through indirect means. For example, if the host device does not support direct execution of the injected application or driver, it may be possible to achieve the same result by instructing the host device to "restart" itself, whereupon the injected application or driver is recognized by the host device as an object that should be invoked (i.e., so that the host device starts up with the injected application or driver running). Once the injected application or driver is executing, it is able to direct operation of the host device, including having the host device issue appropriate commands to the client device for achieving a desired task (e.g., uploading photographs for wireless transmission).

Invocation of execution at the host device is perhaps best illustrated by way of example. The following example presents a command sequence illustrating invocation of an injected application or driver at a host device supporting the Java environment (i.e., including the Java Virtual Machine).

Example #1

Java Environment

The following commands will start an application in the host device's Java environment:
Command: LoadApplication LoadApp(name=MyApp, size= (appsize), data=(binary application data))
Reply: LoadAppR(status=(pass/fail), handle=AppHand))
Command: StartApplication StartApp(handle=AppHand)
Reply: StartApp(status=(pass/fail))

As result of this command sequence, the injected application is now running on the host device's Java Virtual Machine.

Example #2

Palm Environment

The following command sequence will load an application into a Palm device.
Command: LoadApplication LoadApp(name=MyApp, size= (appsize), data=(binary application data))
Reply: LoadAppR(status=(pass/fail), handle=AppHand))

The user will need to manually run the application as a normal Palm application to begin using the application. Future versions of Palm-compatible devices may allow automatic execution, as the above Java environment.

G. Summary of Overall Operation

Figure 4A:
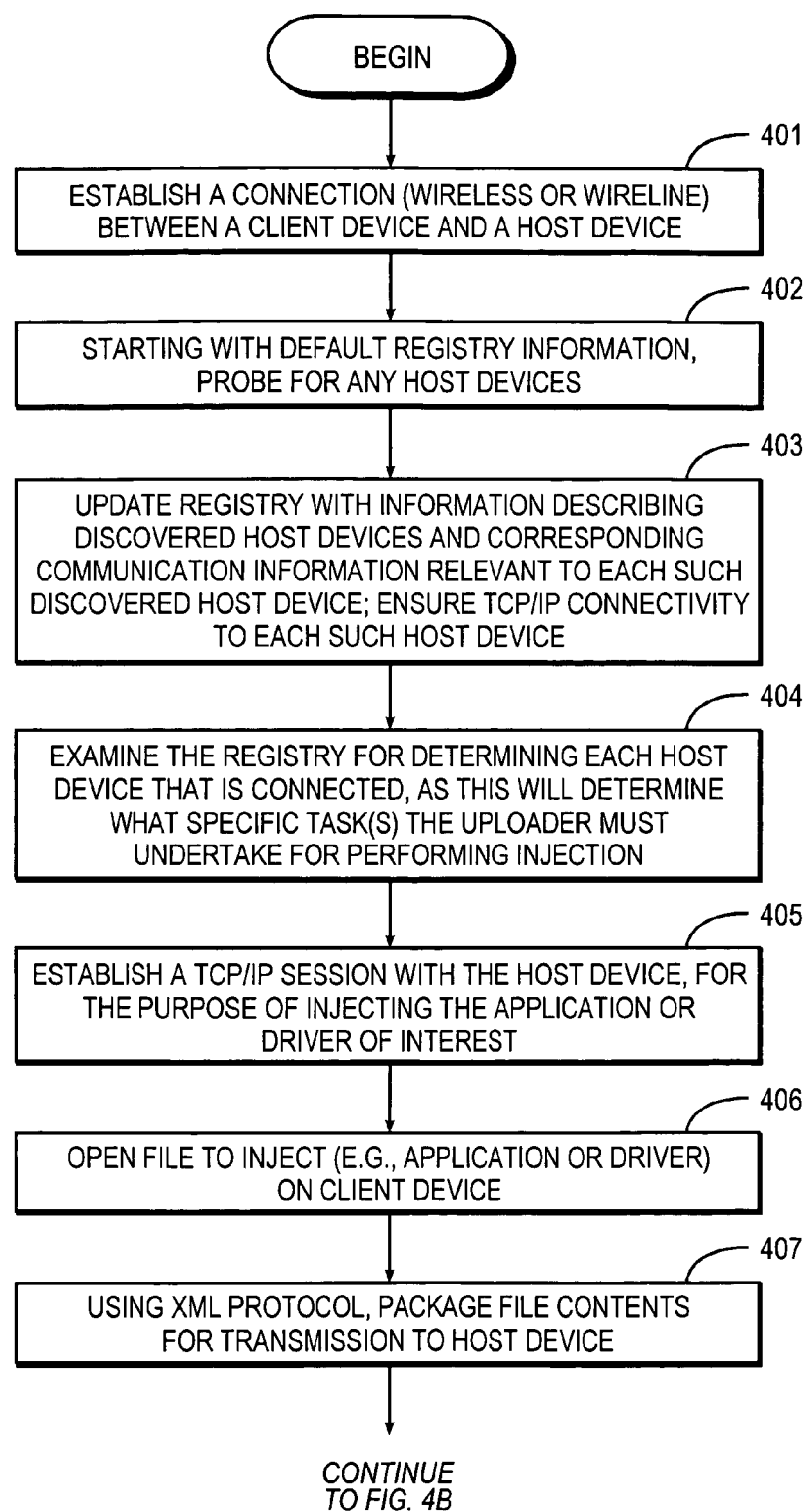
FIGS. 4A-B are flowcharts illustrating the overall methodology of operation for the application/driver uploader system of FIG. 3.
Figure 4B:
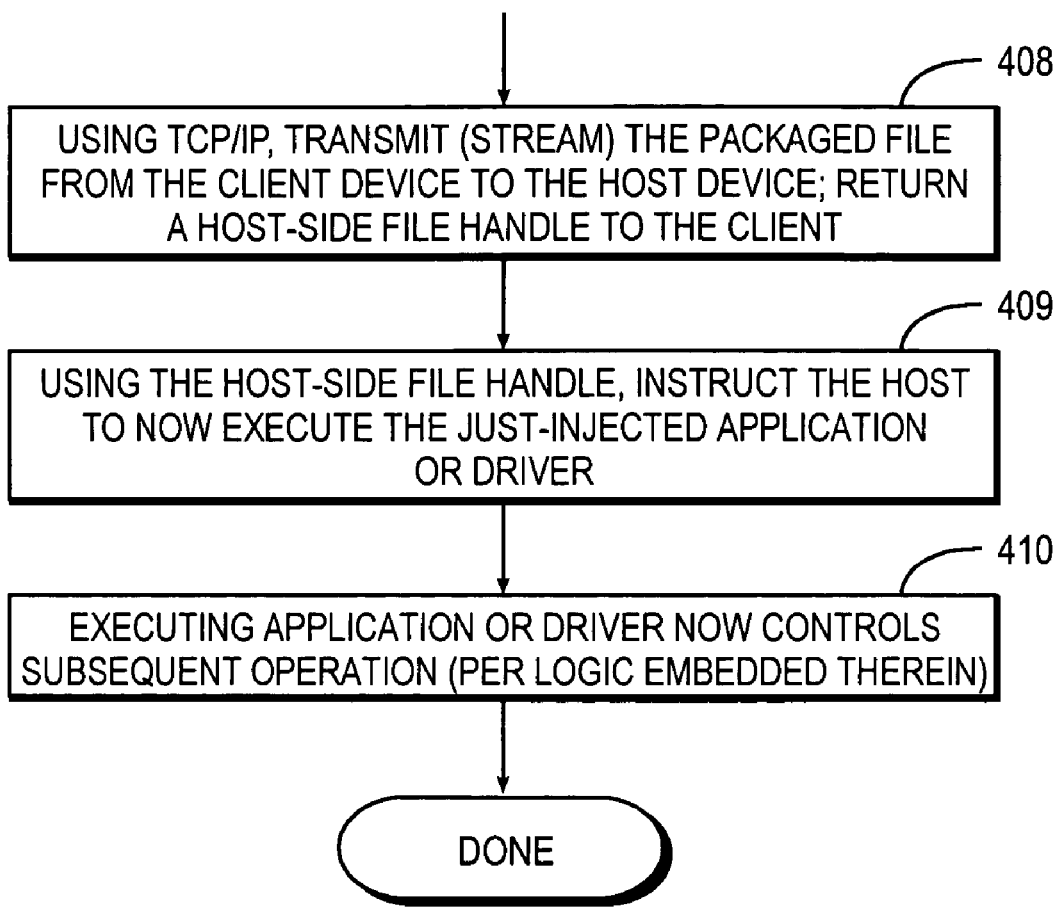

Referring now to FIGS. 4A-B, the overall method or process of the present invention may be summarized by the following method steps. As shown at step 401, the process gets underway upon the establishment of a connection (wireless or wireline) between a client device and a host device; the connection may be permanent or temporary. At step 402, starting with default registry information, the client device probes for any host devices. As described, this task falls specifically on the PHY manager. Based on the information uncovered at step 402, the registry (i.e., registry 333 above) is updated, at step 403, with information describing discovered host devices and corresponding communication information relevant to each such discovered host device. As part of this step, the PHY manager will ensure TCP/IP connectivity to each such host device.

Now, the method may proceed with injection of the application or driver into the host device(s). At step 404, the method may examine the registry for determining each host device that is connected, as this will determine what specific task(s) must be undertaken for performing injection (i.e., to inject an appropriate application or driver into each such host device). At step 405, a TCP/IP session is established with the host device, for the specific purpose of injecting the file or object of interest (e.g., application or driver). At step 406, the file is opened on the client device; as part of this process, a client-side file handle is obtained. From the perspective of the client device, the file is simply a binary object to be injected. The specific relevance of the file will be uncovered at the host device, when the file is ultimately executed at the host device. Having obtained a valid file handle for the file to be injected at step 406, the method may now proceed to package the file contents for transmission to the host device, as indicated at step 407. In the currently-preferred embodiment, the XML protocol is employed for this packaging. Now, using TCP/IP, the packaged file may be transmitted (streamed) from the client device to the host device, as indicated by step 408. In conjunction with this step, a host-side file handle is returned to the client device.

At this point, the method is now ready to trigger execution of the just-injected application or driver at the host device. Using the host-side file handle, the method instructs the host to now execute the just-injected application or driver, as indicated by step 409. As previously described, host-side execution may require host-specific operations. In the straightforward case, the host is simply instructed to begin execution of the application or driver. If the host device does not support that functionality, however, execution of the application or driver may be accomplished through indirect means, such as instructing the host to "restart" itself and thereupon execute the application or driver (e.g., by placing the application or driver in a location where the host will automatically load it for execution upon startup). Thereafter, as indicated by step 410, operation between the client and host devices continues as specified in the now-executing application or driver, which itself in turn may unpackage other drivers for execution. In typical operation, the application or driver would issue particular commands to the client device, for instance, requesting that the client device transmit particular information that is to be processed by the host device (e.g., uploading digital photographs from the client device to the host device, for wireless transmission by the host device).

FTP-Like Photo-Serving Methodology by Digital Camera Devices

A. General

In today's pervasively-connected computer environment, it is desirable to support communication to a variety of hosts, both near and far. Therefore, any approach adopted should be highly flexible with respect to the kinds of hosts and distances involved in communicating with those hosts, thereby providing reliable short-haul and long-haul communication in a manner that is not specific to each of the physical communication environments/media required at a given moment. Moreover, it is desirable to implement an approach which leverages existing protocol suits, such as TCP/IP, thereby allowing a client device, such as a digital camera device, to avoid adopting a one-off proprietary solution. Yet, the approach should also be extensible, thus allowing the incorporation of additional services and maintenance protocols.

In accordance with the present invention, FTP-like photo-serving capability is incorporated into a digital camera device in order to allow it to act like a file server, so that digital images or other files on that device may be easily accessed by a variety of disparate hosts over standard protocols (e.g., in the same manner that a variety of disparate client devices may access files over the Internet from an FTP server). FTP (File Transfer Protocol), a standard Internet protocol, is the simplest way to transfer data (particularly, files) reliably and efficiently between computers on the Internet. Like the HyperText Transfer Protocol (HTTP), which transfers displayable Web pages and related files, and the Simple Mail Transfer Protocol (SMTP), which transfers e-mail, FTP is an application protocol that uses the Internet's TCP/IP protocols. FTP is commonly used to transfer Web page files from their creator to the computer that acts as their server for everyone on the Internet. It is also commonly used to download programs and other files to your computer from other servers. Currently-available Web browsers can also make FTP requests to download programs a user selects from a Web page.

A particular advantage of FTP is its ability to shield one system from variations or peculiarities in the file storage systems of available hosts. As a result, using FTP, a user can also easily update (delete, rename, move, and copy) files, even though the files themselves reside at a server, located thousands of miles away, that employs a file storage system radically different than that employed by the user's own system. The File Transfer Protocol (FTP) itself is defined by RFC 959, which is hereby incorporated by reference. Implementation of an environment embodying a communication stack and method of operation for providing FTP-like functionality to a digital camera device will now be described in detail.

B. Enhanced Communication Stack Supporting Photo-Serving Protocols

Figure 5:
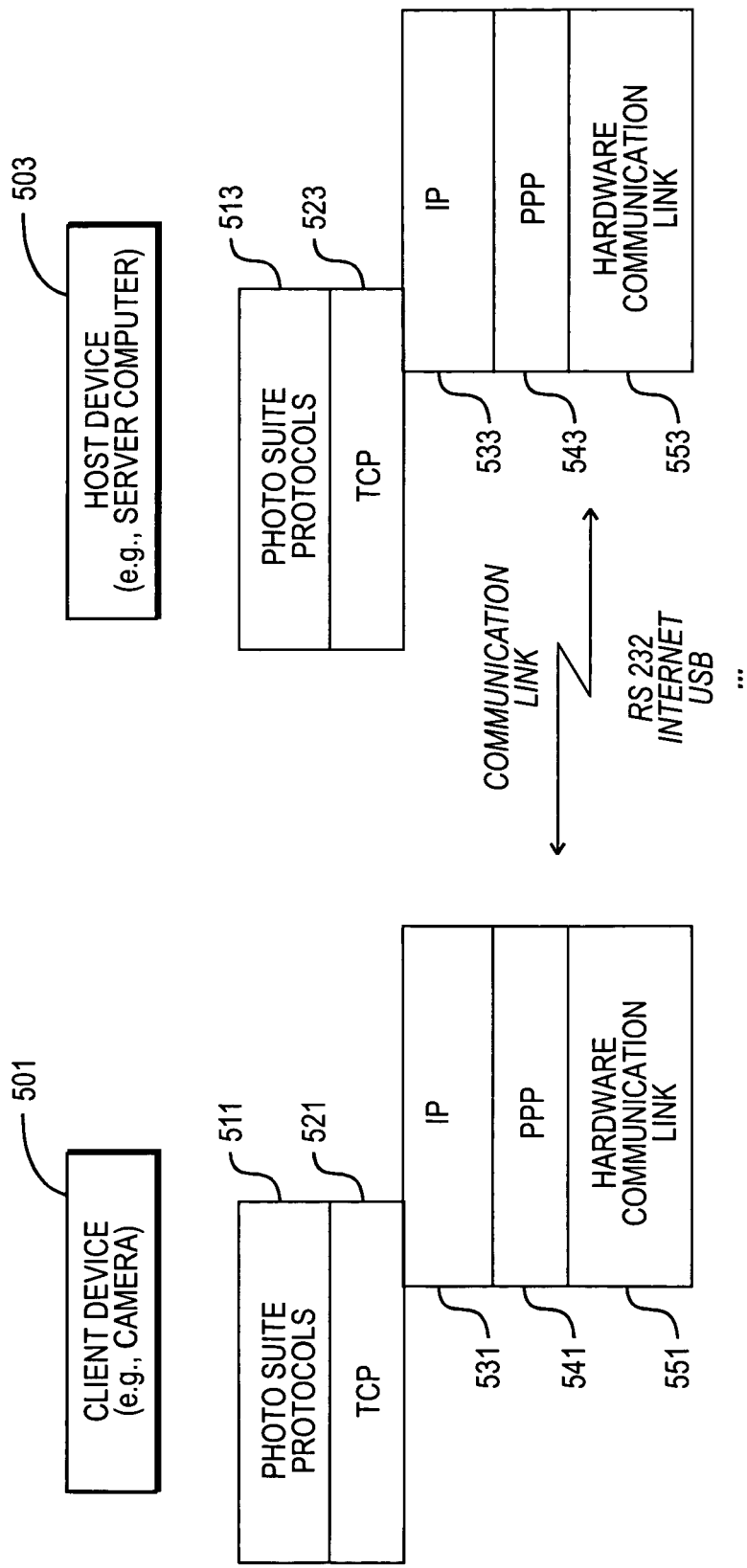
FIG. 5 is a high-level block diagram of a communication environment of the present invention, which is employed for implementing an enhanced communication stack a supporting photo-serving protocols.

Referring now to FIG. 5, a high-level block diagram of a communication environment of the present invention will now be described. As shown, both the client device 501 (e.g., digital camera) and the host device 503 (e.g., desktop or server computer) include a communication stack incorporating industry-standard protocols, including: a hardware communication link layer (e.g., RS-232, USB, wireless, or the like), a PPP layer, an IP layer, and a TCP layer. Additionally, the communication stack of each is enhanced to include a photo-serving protocols suite of the present invention, within the context of providing FTP-like photo-serving capability to a digital camera device. Each layer is discussed in turn.

In any given communication scenario, there exists a physical (hardware) communication link between devices, whether the link is local RS-232 connectivity, USB connectivity, Internet connectivity, or wireless connectivity. Thus, for client device 501 and host device 503, each includes a hardware communication link (layer), shown as layers 551, 553, respectively. Conceptually, above a device's hardware communication link is a Point-to-Point (PPP) communication layer, which typically is implemented by both the client device and host device. This is illustrated as PPP layer 541 for the client device 501, and PPP layer 543 for the host device 503. However, for a given environment, the PPP layer may not be implemented on certain host devices (based on a particular device's lower-level connectivity). The PPP layer includes the ability to accommodate minor variations in its configuration, as required for the properties of a given physical communication link. Above the PPP layer, each device includes an IP (Internet Protocol) layer, which is implemented by both the client device and host device, as shown at IP layer 531, 533, respectively.

The next-higher layer is the TCP (Transmission Control Protocol) layer. This is shown at TCP layer 521, 523, respectively. On top of each TCP layer, the environment includes a photo-serving protocols suite: photos-suite protocols (layer) 511 for the client device 501, and photos-suite protocols (i.e., photo-serving protocols suite layer) 513 for the host device 503. The photo-serving protocols suite layer embodies the primary functionality for transferring digital photos from the client (camera) device to the host, or vice versa (e.g., for host-initiated manipulation of digital photos residing on the client device). In a more-generic embodiment (e.g., one which is not camera-specific), existing FTP protocols themselves may be used instead of the photo-serving protocols employed in the preferred embodiment; in that case, the hosting device will typically already include FTP support.

On the client device, an extra layer is (logically) laid on top of the hardware communication link layer 551. This is the PHY (physical) manager (layer) that allows the camera to get information regarding the kind(s) of (physical/hardware) communication link that is available; this may be provided by the previously-described PHY (physical) manager 321 (of FIG. 3). The layer can automatically: (1) configure whether it is a "calling" or "answering" party, (2) determine the nature of the communication link provided (which may then be used by the photo-serving protocols), and (3) determine the cost of the communication link provided. The PHY manager provides all layers above it with an identifier characterizing the currently-available communication link. This allows those upper layers to adjust their own configurations, as needed, for digital communication. As previously described, the PHY manager includes a knowledgebase—the registry (registry 333 of FIG. 3)—with a priori knowledge of communication links/media supported. As a result, the PHY manager also knows beforehand certain preferences that may be required to enable the use of industry-standard protocols in a manner that is appropriate for a given (physical) communication link, including, for instance, transmission speed properties (and potential transmission costs to users). In this fashion, the PHY manager provides flexibility in sensing the available connectivity.

C. Procedural Operation of Enhanced Communication Stack

Figure 6:
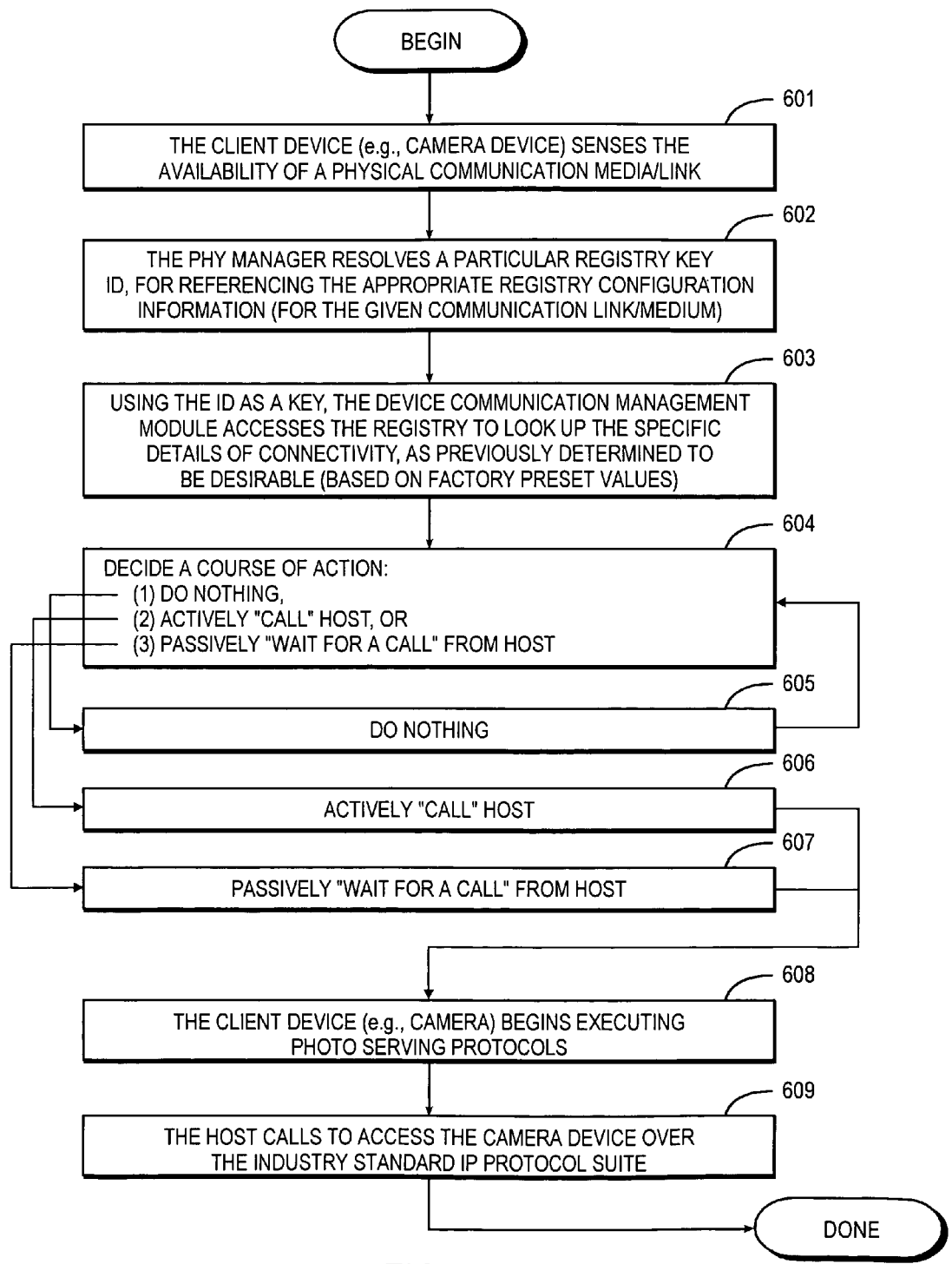
FIG. 6 is a flowchart illustrating procedural operation of the enhanced communication stack of the present invention.

Referring now to FIG. 6, high-level operation will now be described. In the exemplary embodiment of a mobile digital camera device connected to a computer host (e.g., handheld, desktop, or server computer), the following operation occurs in the context of the user connecting the camera device (through wireless or wireline means) to the host device, for the exemplary purpose of uploading photos from the camera device to the host device, whether the hosts be local or remote. The camera device enables the movement of photographic information from the camera to a host device (or vice versa) by continually looking for ways to communicate with an appropriate host (for the particular user). Based on a priori knowledgebase preferences stored in the camera-side registry, the PHY manager, as incorporated into the camera device, seeks out certain physical communication media/links. At the outset, therefore, the client device (e.g., camera device) senses the availability of a physical communication medium/link, as indicated by step 601. This may result, for instance, from the occurrence of a communication cable being plugged into the camera device, a modem being plugged into the camera device, a cellular phone being plugged into the camera device, or any other device supporting byte-by-byte, serial-like communication with the camera device.

In the currently-preferred embodiment, this act of sensing an available communication link/medium is undertaken in a query/response fashion. Because of the knowledgebase information, the expected response for a given query is known in advance. In particular, each expected response is stored as a long-term preference registry setting, as a factory preset value. Upon establishing an identification for a given communication link of an attached host device, the PHY manager signals a higher-level communication module, the device communication management module, as to the details of the communication link/medium (which are known a priori, based on registry configuration). In particular, the PHY manager is able to resolve a particular registry key ID, for referencing the appropriate registry configuration information (for the given communication link/medium). This step is indicated by step 602. Using the ID as a key, the device communication management module accesses the registry to look up the specific details of connectivity, as previously determined to be desirable (based on factory preset values), as indicated by step 603. In other words, based on the ID, the device communication management module may reference the registry for determining a desired communication subconfiguration, which has been previously specified as desirable by the device's vendor during manufacturing.

The subconfiguration information indicates a particular type of activity that the client device should engage in, with respect to providing FTP-like photo-serving capability through the uncovered communication link/medium. The choices are as follows: (1) do nothing, (2) actively "call" host, or (3) passively "wait for a call" from host. This decision point is represented by step 604. The individual cases function as follows. The "do nothing" action scenario represents a situation where no picture information exists to move or transmit, in which case the camera has simply been attached to a physical link. This "do nothing" action state is represented by step 605; as shown, the device may progress to one of the other action states (i.e., call host or wait for call, as desired).

The "call host" action scenario represents a situation where the camera device establishes a communication session with the host, using industry-standard communication protocol layers (e.g., PPP, TCP, and IP, as previously introduced), as indicated by step 606. Once the communication session has been established, an error-free communication channel exists between the camera device and the host device. In this instance, the camera may begin executing photo-serving protocols of the present invention, as indicated by step 608. As an alternative, though, the device may enter a "passively wait for a call from host" state, shown at step 607, which instructs the device to remain in standby mode waiting for the host to initiate communication, with the method thereafter preceding to step 608, as shown. This action scenario represents a situation where the camera device waits for a call from the host in the PPP sense. Thereafter, the photo-serving protocols may be invoked in the same manner (by the method preceding to step 608). After completion of step 608, the host calls to access the camera device over the industry-standard IP protocol suite, as indicated by step 609.

Host-side support for file-serving or photo-serving protocols may be supplied, as needed, by injection of an appropriate driver into the host, in the manner previously described. In particular, host-side support for the file or photo-serving communication protocols may be enabled, if it does not already exist at the host, by automatically uploading a driver from the portable device to the particular host device and thereafter invoking execution of the driver at the particular host device, so that the host device may access digital images or files residing on the portable device, as if the portable device were a file server. In a more-generic embodiment (e.g., non-camera embodiment), FTP itself may be employed to provide file-serving communication protocols (instead of the photo-serving communication protocols, which are more specific for digital camera embodiments), in which case the host will typically already include FTP support or other generic file-serving protocols. In instances where generic FTP is desired but the host does not yet include support, FTP support or other appropriate file-serving protocols may be injected into that host, in a manner similar to that described above for injecting the photo-serving protocols.

The photo-serving protocols present the camera device as a remote file system to the host, whereupon the host may then readily access individual photographic images residing on the camera device (i.e., with the same ease that the host device may access images on its own local storage). The photo-serving protocols run in a single, consistent manner, regardless of how the communication session itself was established.

D. Implementation of FTP-Like Protocols

1. Exemplary Dialog Session

In accordance with the present invention, the client device provides FTP-like server functionality to any host, thereby allowing a multitude of disparate hosts to access files on the client device in a transparent manner. In the preferred embodiment of the client device comprising a digital camera, for instance, each host may access digital images residing on the camera as files, using simple content-agnostic FTP-like transfer protocols of the present invention. These protocols will now be illustrated in detail.

Figure 7:
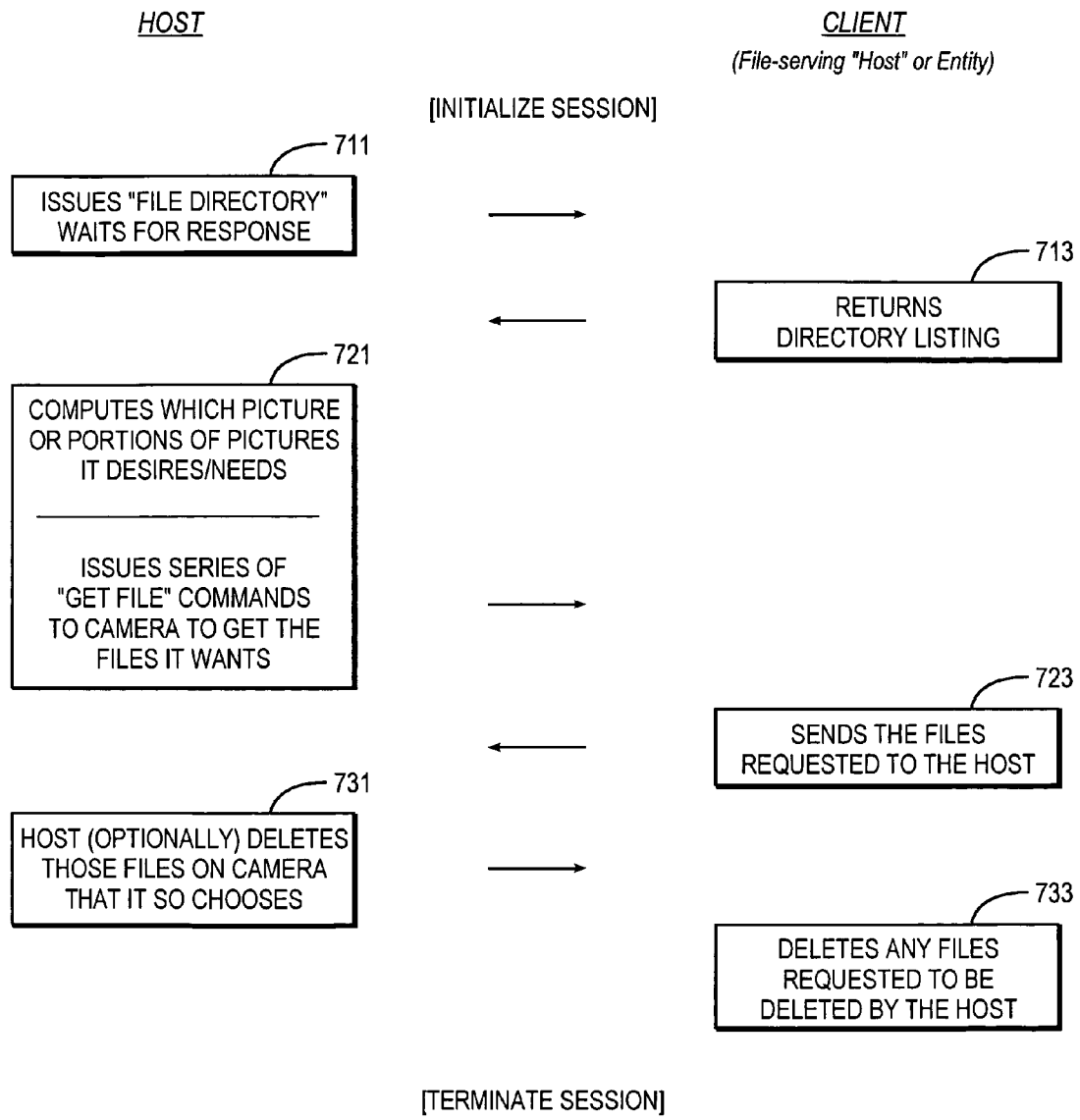
FIG. 7 is a block diagram illustrating an exemplary client device-to-host dialog session, which employs the FTP-like transfer protocols of the present invention.

FIG. 7 illustrates an exemplary client device-to-host dialog session, which employs the FTP-like transfer protocols of the present invention. After initialization of the session (e.g., through exchange of handshake messages), the host issues a "File Directory" command and then waits for a response, as indicated at 711. In response, the client device returns a directory listing of relevant files, as shown at 713. Now, the host may compute which objects or files it desires/needs. For a digital camera client device embodiment, objects or files of interest to the host include digital pictures or portions of digital pictures (e.g., from a progressive file format). Based on this determination, the host issues a series of "Get File" command messages to camera or client device to get the files it wants. This portion of the dialog sequence is illustrated at 721. Responsive to the request, the client sends the requested files back to the host, as shown as 723. The hosts may now (optionally) delete those files, which it so chooses, from the camera or client device, as illustrated at 731. In response, the client device deletes any files so requested, as shown at 733. Thereafter, the FTP-like session may terminate.

2. Exemplary Syntax Supporting Dialog Session

In accordance with the present invention, the command messages employed during the dialog session are packaged in XML syntax. As previously described, the system of the present invention includes an XML parser (323) that provides XML-compatible support for issuing commands and transmitting data. In particular, the dialog session commands are packaged using XML syntax, which provides an extensible tag-based approach to wrapping data. Exemplary syntax command messages will now be presented in further detail.

(a) Delete File

The following commands, exchanged between the host (application) and the client (camera) device, will delete a file from the camera or client:

(1) Host-to-client command request:
<CamFDel>
<name>(value)</name>
</CamFDel>
(2) Client-to-host command response:
<CamFDelR>
<status>(value)</status>Standard error replies or ERR_BAD_NAME
</CamFDelR>

(b) File Directory

The following command exchange will return a listing of files on the client or camera.

(1) Host-to-client command request:
<CamFDir>
<dir>(directory)</dir>
</CamFDir>
(2) Client-to-host command response:
<CamFDirR>
<status>(value)</status> Standard error replies
<num>(value)</num> Number of file names
<file>
  <name>(file1)</name>
  <fsize>(size)</fsize>
  <date>(date)</date>
</file>
<file>
  <name>(file2)</name>
  <fsize>(size)</fsize>
  <date>(date)</date>
</file>
. . .
</CamFDirR>

(c) Send File

The following command exchange allows the host (application) to send a file (either a photo or application file) to the camera. This can be used for upgrading code as well as photo sharing.

(1) Host-to-client command request:

<CamSendFile>
  <name>(value)</name> Name of the file
  <bin>
    <size>(value)</sixe> Value is number of bytes of Data
    (data) Data is the requested image
  </bin>
</CamSendFile>
(2) Client-to-host command response:
<CamSendFileR>
<status>(value)</status>Standard error replies or ERR_BAD_NAME
</CamSendFileR>

(d) Get File

The following command exchange will cause the camera to send a file to the host (application).

(1) Host-to-client command request:
<CamGetFile>
<name>(file)</name> Name of the file
<startByte>(data)</startByte> Start byte of data
<fsize>(data)</fsize> Number of bytes
</CamGetFile>
(2) Client-to-host command response:
<CamGetFileR>
<status>(value)</status> Standard error replies or ERR_BAD_NAME
<bin>
  <size>(value)</sixe> Value is number of bytes of Data
  (data) Data is the requested image
</bin>
</CamGetFileR>

The <startByte> and <fsize> values are optional. These values allow retrieval of partial files. If these tags are not present, the whole file will be returned.

E. Advantages

The advantages with this approach include the following. The camera device, at the level of the photo-serving protocols, functions in an identical manner no matter what host the camera device is attached to, and no matter how an individual industry-standard protocol suite is borne or implemented. Thus, a variety of host devices can access digital photos (or other files or objects) on the camera device with the same ease that a desktop computer may access files from an FTP server. All hosts that are commonly available include implementations of industry-standard TCP/IP protocols on which the photo-serving protocols may be borne. As a result, no host need have a proprietary, one-off solution to bear the photo-serving protocols. In this manner, the photo-serving protocols provide various hosts with the capability to engage in an FTP-like session with the camera device to receive and manipulate photographic image information captured on the digital camera device.

Using the approach of the present invention, a manufacturer can determine a priori the connectivity schemes that are to be supported. Then, the manufacturer may embody the corresponding preferences for each of those connectivity schemes into a registry or preference store module. Using the registry, the PHY manager can apply sensing methodology to determine what communication facilities are available at any time. This allows a given device to automatically adjust and auto-configure industry-standard protocols, without any real user intervention whatsoever. This allows the device to leverage the availability of existing industry-standard protocols on a wide variety of hosts for supporting higher-level photo-serving protocols on a large variety of disparate hosts, regardless of whether a given host is wireless or wireline, or Internet-connected or not. In this fashion, a camera device can act as an FTP-like photo-serving device, in a fully-automated manner that is transparent to the user.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. A method for providing a variety of disparate host devices access to digital images residing on a digital camera device, the method comprising upon connection of the digital camera device to a particular host device that is capable of hosting digital camera devices, the digital camera device:

sending, prior to establishing a communication session on top of a physical communication link for a communication stack of the connection, one or more queries over the connection, the one or more queries being associated with one or more expected responses stored in a knowledgebase including a registry, the communication stack having one or more communication layers including the communication session, each communication layer corresponding to a communication protocol;

comparing a response received in response to the one or more queries over the connection with the one or more expected responses to determine an identifier for a kind of the physical communication link for the communication stack of the connection to the particular host device;

looking up a preferred configuration for the one or more communication layers according to the determined identifier referencing the settings in the registry;

allowing communication between the digital camera device and the particular host device;

automatically identifying the particular host device that the digital camera device is currently connected to;

based on said determined kind of physical communication link, establishing the communication session between the digital camera device and the particular host device for the communication stack of the connection, said communication session supporting photo-serving communication protocols that present the digital camera device as a file server to the host device; and through said photo-serving communication protocols, allowing the host device to access digital images residing on the digital camera device, as if the digital camera device were the file server, wherein said particular host device and said digital camera device support TCP/IP connectivity corresponding to one of the communication protocols of the communication stack and wherein the communication session is a TCP/IP session.

2. The method of claim 1, wherein said connecting step includes:

connecting the digital camera device to a particular host device over a wireless communication medium.

3. The method of claim 1, wherein said connecting step includes:

connecting the digital camera device to a particular host device over a wireline communication medium.

4. The method of claim 3, wherein said wireline communication medium includes a selected one of serial (RS-232) and USB (Universal Serial Bus) connectivity.

5. The method of claim 1, wherein said particular host device comprises a handheld computing device.

6. The method of claim 1, wherein said particular host device comprises a cellular phone device.

7. The method of claim 1, wherein further comprising: updating the knowledge base with corresponding communication information relevant to the particular device connected.

8. The method of claim 1, wherein said particular host device includes facilities for offloading digital images from said digital camera device, wherein the preferred configurations include transmission speed properties of the kind of the physical communication link identified by the identifier.

9. The method of claim 1, wherein said particular host device includes facilities for manipulating digital images, while those digital images reside on said digital camera device.

10. The method of claim 1, wherein said identifying step occurs immediately upon connection of the digital camera to the particular host device.

11. The method of claim 1, wherein said identifying step includes:

probing the particular host device in a query/response fashion, for identifying the particular host device, the registry including keys comprising one or more query/response pairs, and wherein the probing comprises sending query-byte sequences according to one of the query/response pairs.

12. The method of claim 11, wherein said probing step includes:

referencing a knowledgebase that stores expected responses, for identifying the particular host device.

13. The method of claim 12, wherein said expected responses comprise factory preset values.

14. The method of claim 12, wherein said knowledgebase is stored in a registry of the digital camera device.

15. The method of claim 1, wherein said communication session established between the digital camera device and the particular host device employs TCP/IP connectivity through use of Point-to-Point protocol.

16. The method claim 1, wherein said photo-serving communication protocols comprise a photo-specific interface allowing the particular host device to directly access digital images on a per-file basis, while those images reside on the digital camera device.

17. The method of claim 1, wherein said photo-serving communication protocols comprise a command set providing the particular host device with file-based access and manipulation of digital images residing on the digital camera device.

18. The method of claim 1, further comprising:

providing host-side support for the photo-serving communication protocols by injecting an appropriate driver into the particular host device.

19. The method of claim 18, wherein the appropriate driver is initially stored on said digital camera device and is injected into the particular host device upon connection of the two devices together.

20. A method for a digital camera device to provide a variety of disparate host devices access to files residing on digital camera device, upon the digital camera device's connection to one of the host devices, the method comprising:

sending, prior to establishing a communication session on top of a physical communication link for a communication stack of the connection, one or more queries over the connection, the one or more queries being associated with one or more expected responses stored in a knowledgebase including a registry, the communication stack having one or more communication layers including the communication session, each communication layer corresponding to a communication protocol;

comparing, subsequently to sending the one or more queries, a response received over the connection with the one or more expected responses to determine an identifier for a kind of a physical communication link for the communication stack of the connection to the particular host device;

looking up preferred configurations for the one or more communication layers according to the determined identifier referencing the settings in the registry;

allowing communication between the digital camera device and the particular host device;

automatically identifying the particular host device that the digital camera device is connected to; and based on said determined kind of physical communication link:
(1) establishing the communication session between the digital camera device and the particular host device for the communication stack of the connection, said communication session supporting file-serving communication protocols that present the digital camera device as a file server to the host device; and
(2) if needed by the host for supporting said file-serving communication protocols, automatically uploading a driver from the digital camera device to the particular host device and thereafter invoking execution of the driver at the particular host device, for providing host-side support for said file-serving communication protocols, wherein said particular host device and said digital camera device support TCP/IP connectivity corresponding to one of the communication protocols of the communication stack and wherein the communication session is a TCP/IP session.

21. The method of claim 20, wherein said connecting step includes:
connecting the digital camera device to a particular host device over a wireless communication medium.

22. The method of claim 20, wherein said connecting step includes:
connecting the digital camera device to a particular host device over a wireline communication medium.

23. The method of claim 22, wherein said wireline communication medium includes a selected one of serial (RS-232) and USB (Universal Serial Bus) connectivity.

24. The method of claim 20, wherein said particular host device comprises a computing device.

25. The method of claim 20, wherein said particular host device comprises a handheld computing device.

26. The method of claim 20, wherein said particular host device comprises a cellular phone device.

27. The method of claim 20, further comprising: updating the knowledge base with corresponding communication information relevant to the particular device connected.

28. The method of claim 20, wherein said particular host device includes facilities for offloading files from said digital camera device, wherein the preferred configurations include transmission speed properties of the kind of the physical communication link identified by the identifier.

29. The method of claim 20, wherein said particular host device includes facilities for manipulating files, while those files reside on said digital camera device.

30. The method of claim 20, wherein said identifying step occurs immediately upon connection of the digital camera device to the particular host device.

31. The method of claim 20, wherein said identifying step includes:
probing the particular host device in a query/response fashion, for identifying the particular host device, wherein registry includes one or more query/response pairs arranged in an order, wherein the probing comprises sending query-byte sequences according to one of the query/response pairs.

32. The method of claim 31, wherein said probing step includes:
referencing a knowledgebase that stores expected responses, for identifying the particular host device.

33. The method of claim 32, wherein said expected responses comprise factory preset values.

34. The method of claim 32, wherein said knowledgebase is stored in a registry of the digital camera device.

35. The method of claim 20, wherein said communication session established between the digital camera device and the particular host device employs TCP/IP connectivity through use of Point-to-Point protocol.

36. The method claim 20, wherein said file-serving communication protocols comprise a file-specific interface allowing the particular host device to directly access files, while those files reside on the digital cameral device.

37. The method of claim 20, wherein said file-serving communication protocols comprise a command set providing the particular host device with file-based access and manipulation of files residing on the digital camera device.

38. The method of claim 20, further comprising:
providing host-side support for the file-serving communication protocols by injecting an appropriate driver into the particular host device.

39. The method of claim 38, wherein the appropriate driver is initially stored on said digital camera device and is injected into the particular host device upon connection of the two devices together.

40. A digital camera device allowing a variety of disparate host devices access to files residing on the digital camera device, upon the digital camera device's connection to one of the host devices, the digital camera device comprising:

a connection interface for enabling the connection of the digital camera device to a particular host device that is capable of hosting the digital camera device;

an identification module configured for sending, prior to establishing a communication session on top of a physical communication link for a communication stack of the connection, one or more queries over the connection, the one or more queries being associated with one or more expected responses stored in a knowledgebase including a registry having key settings configured with factory preset values, the communication stack having one or more communication layers including the communication session, each communication layer corresponds to a communication protocol comparing, subsequently to sending the one or more queries, a response received over the connection with the one or more expected responses according to the key settings of the registry to determine an identifier for a kind of the physical communication link for the communication stack of the connection to the particular host device;

looking up preferred configurations for the one or more communication layers according to the determined identifier referencing the configured key settings in the registry device is currently connected to, wherein the key settings include sub-keys as a table of possible communicating devices that may be connected from time to time to the digital camera device and wherein the particular host device is indicated by one or more internal flags updated according to the identification; and a communication module for establishing, based on said determined kind of physical communication link, the communication session between the digital camera device and the particular host device, wherein said communication session supports file-serving communication protocols that present the digital camera device as a file server to the host device, wherein the access of the files includes quality of the files depending on the preferred configurations for the preferred configurations for the one or more communication layers of the communication stack, wherein said particular host device and said digital camera device support TCP/IP connectivity corresponding to one of the communication protocols of the communication stack and wherein the communication session is a TCP/IP session.

41. The device of claim 40, wherein said connection interface supports connecting the digital camera device to a particular host device over a wireless communication medium.

42. The device of claim 40, wherein said connection interface supports connecting the digital camera device to a particular host device over a wireline communication medium.

43. The device of claim 42, wherein said wireline communication medium includes a selected one of serial (RS-232) and USB (Universal Serial Bus) connectivity.

44. The device of claim 40, wherein said particular host device comprises a computing device.

45. The device of claim 40, wherein said particular host device comprises a handheld computing device.

46. The device of claim 40, wherein said particular host device comprises a cellular phone device.

47. The device of claim 40, wherein the knowledge base is updated with corresponding communication information relevant to the particular device connected.

48. The device of claim 40, wherein said particular host device includes facilities for offloading files from said digital camera device, wherein the preferred configurations include transmission speed properties of the kind of the physical communication link identified by the identifier.

49. The device of claim 40, wherein said particular host device includes facilities for manipulating files, while those files reside on said digital camera device.

50. The device of claim 40, wherein said identification module operates to identify the particular host device immediately upon connection of the digital camera device to the particular host device.

51. The device of claim 40, wherein said identification module probes the particular host device in a query/response fashion, for identifying the particular host device, wherein the key settings include one or more query/response pairs arranged in an order, wherein the probing comprises sending query-byte sequences according to one of the query/response pairs following the order and wherein the query-byte sequences match the one of the query/response pairs if a value of the one of the query/response pairs is of zero length.

52. The device of claim 51, wherein said identification module references a knowledgebase that stores expected responses, for identifying the particular host device.

53. The device of claim 52, wherein said expected responses comprise factory preset values.

54. The device of claim 32, wherein said knowledgebase is stored in a registry of the digital camera device.

55. The device of claim 40, wherein said communication session established between the digital camera device and the particular host device employs TCP/IP connectivity through use of Point-to-point protocol.

56. The device claim 40, wherein said file-serving communication protocols comprise a file-specific interface allowing the particular host device to directly access files, while those files reside on the digital camera device.

57. The device of claim 40, wherein said file-serving communication protocols comprise a command set providing the particular host device with file-based access and manipulation of files residing on the digital camera device.

58. The device of claim 40, wherein the driver injection module stores an appropriate driver initially on said digital camera device, wherein the driver is injected into the particular host device upon connection of the two devices together.

59. The device of claim 40, wherein the communication session is initially established using Point-to-Point protocol.

60. The device of claim 40, wherein said file-serving communication protocols include FTP (File Transport Protocol) support.

61. The device of claim 40, further comprising: a driver injection module for providing host-side support for said file-serving communication protocols if not already present, said driver injection module operating by automatically uploading a driver from the digital camera device to the particular host device and thereafter invoking execution of the driver at the particular host device, so that the host device may access files residing on the digital camera device, as if the digital camera device were a file server.

* * * * *